United States Patent [19]

Peterson

[11] Patent Number: 4,775,468

[45] Date of Patent: Oct. 4, 1988

[54] SYSTEM FOR MINERAL SLURRY FLOCCULATION AND VACUUM FILTRATION

[75] Inventor: C. Lynn Peterson, Salt Lake City, Utah

[73] Assignee: Peterson Filters Corporation, Salt Lake City, Utah

[21] Appl. No.: 873,182

[22] Filed: Jun. 11, 1986

Related U.S. Application Data

[63] Continuation-in-part of Ser. No. 767,166, Aug. 19, 1985.

[51] Int. Cl.$^4$ .............................................. B01D 33/02
[52] U.S. Cl. ..................................... 210/188; 210/192; 210/202; 210/205; 210/232; 210/241; 210/406; 210/416.1
[58] Field of Search ................ 210/199, 202, 205–208, 210/241, 232, 330, 331, 406, 416.1, 258, 188, 192

[56] References Cited

U.S. PATENT DOCUMENTS

| | | | |
|---|---|---|---|
| 1,919,570 | 7/1933 | Pickard | 210/241 |
| 2,245,588 | 6/1941 | Hughes | 210/715 |
| 2,268,726 | 1/1942 | Tark | 210/196 |
| 2,382,490 | 8/1945 | Lawlor | 210/715 |
| 2,391,738 | 12/1945 | Prager | 210/208 |
| 3,145,171 | 8/1964 | Richter et al. | 210/406 |
| 3,377,274 | 4/1968 | Burke et al. | 210/738 |
| 3,397,788 | 8/1968 | Duff et al. | 210/208 |
| 3,408,293 | 10/1968 | Dajani et al. | 210/727 |
| 3,409,139 | 11/1968 | Jackson et al. | 210/406 |
| 3,523,889 | 8/1970 | Eis | 210/713 |
| 3,578,586 | 5/1971 | Gal et al. | 210/725 |
| 3,591,009 | 7/1971 | Luthi | 210/331 |
| 4,054,514 | 10/1977 | Oltmann | 210/208 |
| 4,055,494 | 10/1977 | Emmett | 210/715 |
| 4,166,471 | 3/1979 | Wyness | 210/715 |
| 4,169,794 | 10/1979 | Badino | 210/330 |
| 4,226,714 | 10/1980 | Furness et al. | 210/738 |
| 4,303,517 | 12/1981 | Love et al. | 210/208 |
| 4,346,010 | 8/1982 | Ogino et al. | 210/714 |
| 4,367,145 | 1/1983 | Simpson et al. | 210/241 |
| 4,477,351 | 10/1984 | Kobayashi | 210/406 |
| 4,526,687 | 7/1985 | Nugent | 210/205 |

FOREIGN PATENT DOCUMENTS

| | | | |
|---|---|---|---|
| 1089128 | 11/1980 | Canada | 210/738 |
| 1225608 | 9/1966 | Fed. Rep. of Germany | 210/199 |
| 2700942 | 7/1978 | Fed. Rep. of Germany | 210/406 |
| 1599625 | 10/1981 | United Kingdom | 210/519 |
| 2143155 | 2/1985 | United Kingdom | 209/5 |

OTHER PUBLICATIONS

Oldshue et al., "Flocculator Impellors: A Comparison", *CEP*, May 1979, pp. 72-75.

*Primary Examiner*—Peter Hruskoci
*Attorney, Agent, or Firm*—Klaas & Law

[57] ABSTRACT

A complete filter system mounted on a support platform that can be supported on a flat bed truck and transported over a highway including a vacuum receiver having a plurality of flat wall portions so that each cross-sectional configuration thereof is generally rectangular in shape.

18 Claims, 14 Drawing Sheets

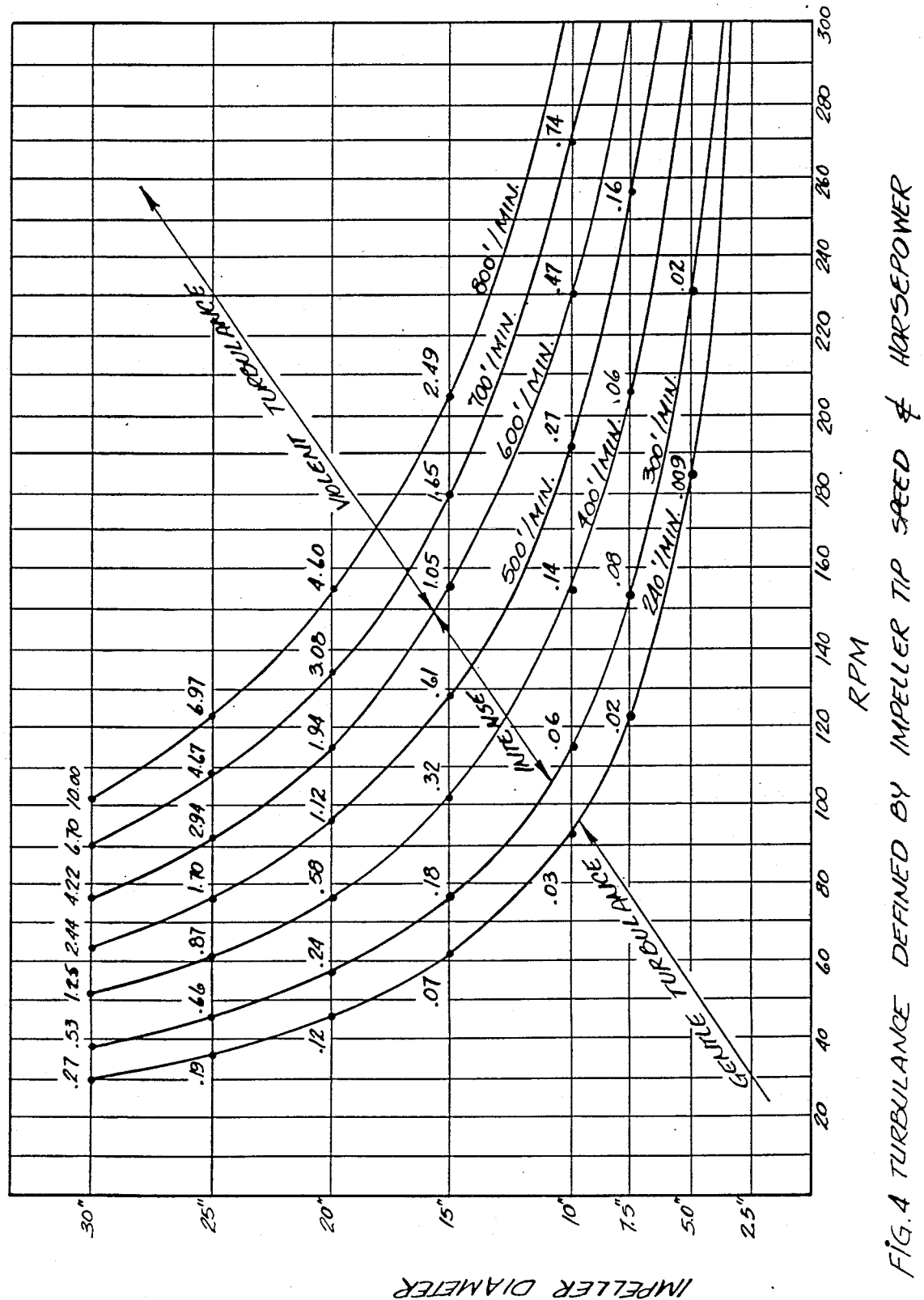
FIG. 4 TURBULANCE DEFINED BY IMPELLER TIP SPEED & HORSEPOWER

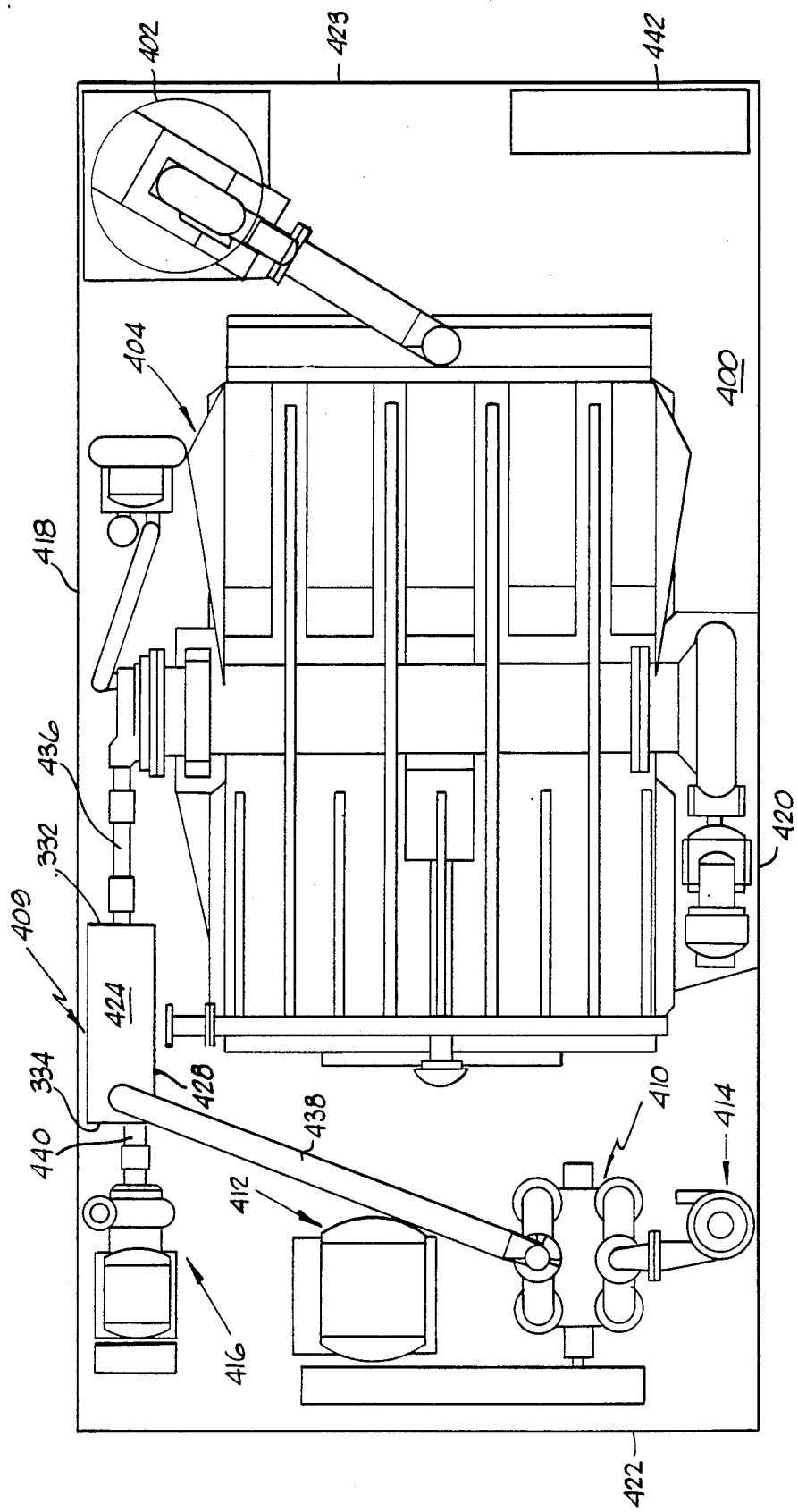

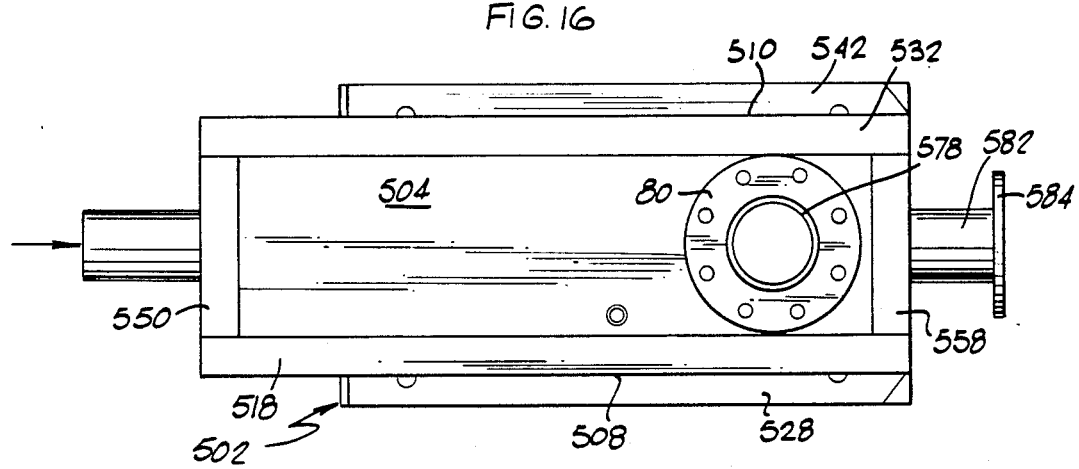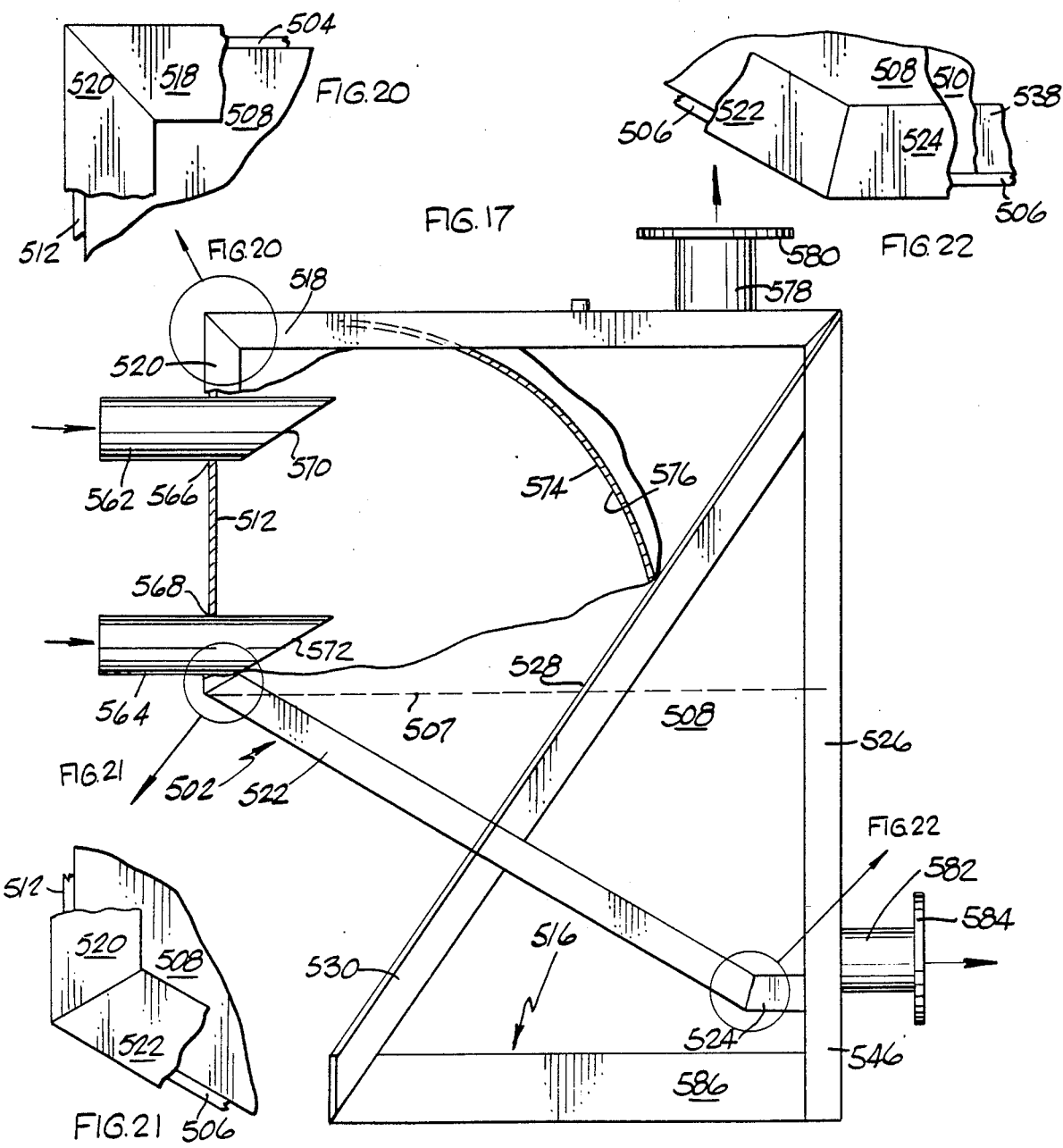

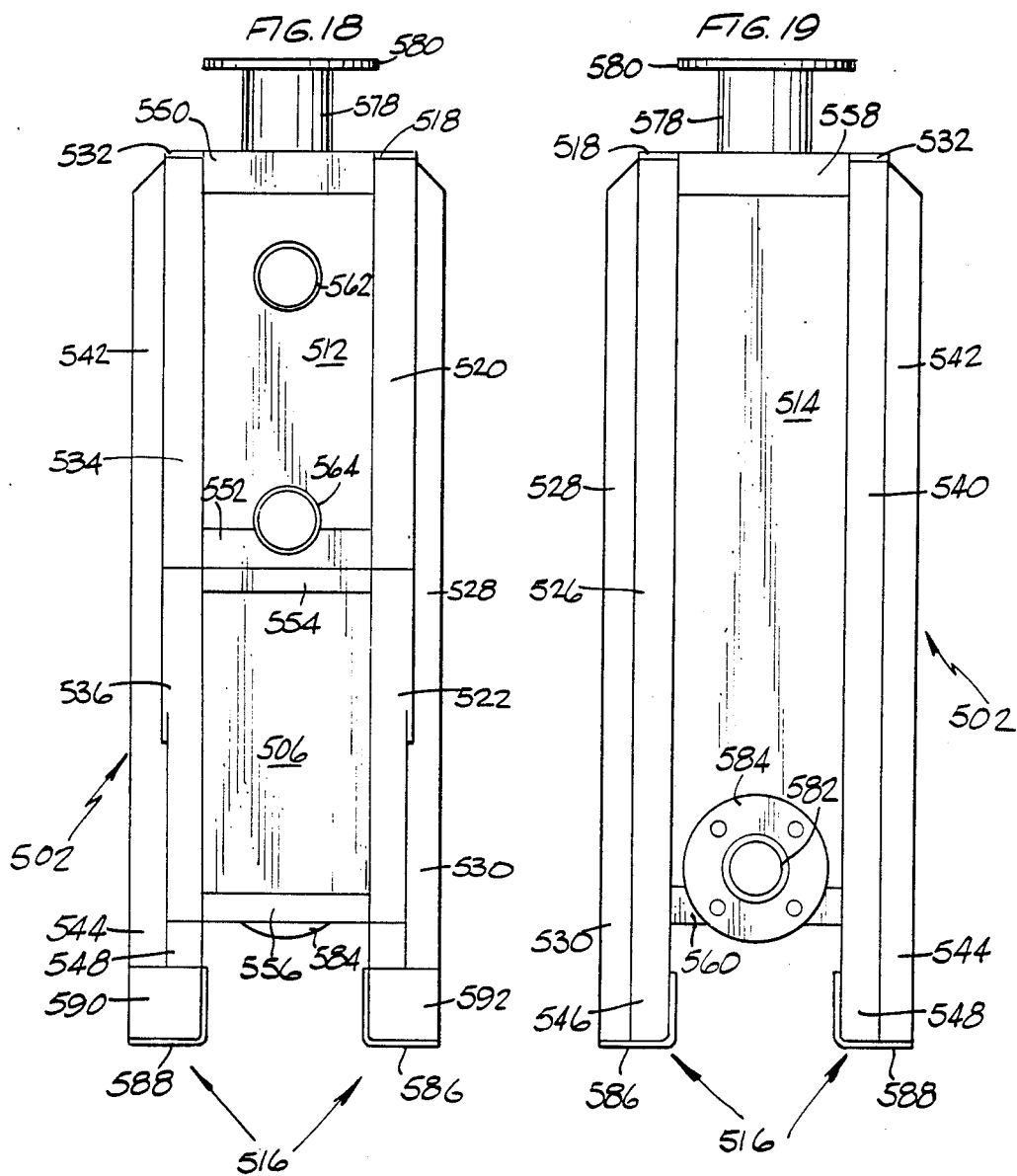

SYSTEM FOR MINERAL SLURRY FLOCCULATION AND VACUUM FILTRATION

This application is a continuation-in-part of U.S. patent application Ser. No. 767,166 filed Aug. 19, 1985.

FIELD OF THE INVENTION

This invention is directed to method and apparatus for continuous processing of mineral slurries to facilitate the filtration of solids from liquids in a slurry including the use of flocculating agents, such as polymers, and more particularly for separating fine solids having particle sizes of about 28 mesh by zero from liquids such as the refuse in a coal preparation plant.

BACKGROUND OF THE INVENTION

In general, mineral slurry processing systems may be of the gravity sedimentation type or of the filter type, as discussed in the Chemical Engineers' Handbook, Fifth Edition. Sedimentation is defined as the removal of suspended solid particles from a liquor stream by gravity settling for the purposes of thickening and/or clarifying. Continuous thickener/clarifier equipment conventionally comprises a tank, a means for introducing a feed with a minimum of turbulence, a drive actuated rake mechanism for moving settled solids to a discharge point, a means for removing the thickened solids, and a means for removing the clarified liquor. Chemical and/or mechanical flocculation may be employed to remove finely divided particles from the effluent. Mechanical flocculation requires gentle circulation of the particles to provide opportunity for agglomeration by contact plus sufficient time for floc growth.

Various methods and apparatus for separating fine particle size solids from liquids are in use today. One such method and apparatus is disclosed in U.S. Pat. No. 3,523,889 to F. G. Eis. In this patent, a flocculating agent is introduced into a slurry which is then discharged from a standpipe and its flow is arrested by a baffle and deflected outwardly for mixing with the liquid in the tank. In Eis, the slurry with the flocculating agent included therein is introduced into the tank in the midst of gentle agitation. Another method is disclosed in U.S. Pat. No. 4,055,494 to R. F. Emmett, Jr. and assigned to Envirotech Corporation. In the Emmett patent, the slurry to be separated is fed successively through four mixing stages and a portion of the flocculating agent is introduced and mixed in each stage using a rotating blade. The Emmett patent does not state the type of agitation in the mixing stages. However, testimony in a trial Amstar Corporation vs. Envirotech Corporation and Energy Field Nuclear, Inc., in the U.S. District Court for the District of Utah Central Division in a division published May 3, 1983, shows that Envirotech sought to test a means of mechanically stirring flocculant and slurry with sufficient force to produce excellent floc formation but not so forceful as to destroy flocs once formed. J. Rosenbau, & J. Clemmer, "Liquid-Solids Separations," in J. Clegg & D. Foley, Uranium Ore Processing 172, 1980 (1958), ("the flocculant must be disseminated uniformly throughout the slurry without degrading the floccules. Intense agitation to distribute the reagent for maximum effectiveness degrades the fragile floccules, and thus defeats its own purpose.") The process in each of Eis and Emmett forms generally butterfly-like floccules which tend to result in cake which is relatively wet and sticky when separated out of the slurry.

SUMMARY OF THE INVENTION

This invention relates to method and apparatus for phase separation of solids in fine particle sizes from a liquid using a flocculating agent, such as an activated polymer mixture, in a zone of intense agitation. In accordance with this invention, the floccules are not fragile but are very strong and when the solids comprise a 28 mesh by zero refuse produced in a coal processing plant are relatively small and generally bead-like in shape and which, when they are separated from the slurry by filtration, result in a cake that is relatively dry and firm. In an embodiment of the invention, as illustrated specifically in this application, ths is accomplished in a separate unit of a coal preparation plant process. It is understood that a coal preparation plant is used for purposes of description only and that the invention is applicable for the separation of any kind of solids from a slurry while using a flocculating agent.

In one embodiment of the invention, a vessel (tank) having at least one processing chamber is provided. The processing chamber has a peripheral outer wall portion extending for 360 degrees about a central vertical axis and has a slurry feed inlet opening in a lower portion thereof and an overflow outlet portion in an upper portion thereof. When the process is in operation, a substantially constant volume of solids, flocculating agent and liquid is maintained in the processing chamber. A first feed slurry comprising solids in a liquid is introduced into the processing chamber through the inlet opening. A flocculating agent, such as a dilute mixture of an activated polymer, is introduced into the first slurry while in the processing chamber. Means are provided to create forces in the processing chamber to cause movement of the first slurry and the flocculating agent in a substantially continuous turbulent flow pattern path from the inlet opening to the outlet opening. The substantially continuous path comprises a plurality of adjacent generally vertical spiral portions extending in a circulatory direction through an arc less than 360 degrees. The amount of the created forces necessary to cause the movement through the substantially continuous path also causes turbulent flow of the combined first slurry and flocculating agent during movement over the substantially continuous path. During the movement through the substantially continuous path, the flocculating agent acts on the solids in the first slurry to change the solids into floccules. While the size and shape of the floccules may vary, the process when used in a coal processing plant produced floccules that appeared to be relatively small and bead-like in configuration.

The invention is ideally incorporated in a filter system wherein all of the required equipment therefor is mounted on a support platform so that it can be shipped on a flat bed truck over the highways. In addition to the flocculating vessel, the required equipment includes a filtering unit for separating the floccules from the slurry, a vacuum receiver for separating a air suspension of water, a vacuum separating a air suspension of water, a vacuum forming means, a silencer, a pump and suitable piping for the transfer of materials.

In one embodiment of the invention, the vacuum receiver comprises a vessel having a plurality of flat wall portions comprising quarter inch steel sheets. The flat wall portions are joined together along their edges by suitable means such as by welding. Reinforcing means comprising two inch by two inch, quarter inch steel angles are secured to the outer surfaces of the flat wall portions along their edges. The vessel has a top wall portion, a bottom wall portion, a front wall portion, a back wall portion, a first side wall portion, a second side wall portion and a base. Inlet means comprising a pair of spaced apart pipes are provided in the first side wall portion close to the top wall portion. Liquid outlet means, comprising a liquid outlet pipe, are provided in the second side wall portion close to the bottom wall portion wherein the liquid outlet pipe is connected in a conventional manner to a pump. Air outlet means, comprising an air outlet pipe, are provided in the top wall portion close to the second side wall portion wherein the air outlet pipe is connected in a conventional manner to means for withdrawing air and forming a vacuum in the vessel. Impingement means comprising a concave arcuate plate extend between and are secured to the front and back wall portions. The impingement means are located so as to cooperate with the upper one of the pair of spaced apart inlet pipes in reducing foam in the air suspension of water.

In operation, water in an air suspension flow into the housing through the inlet pipes and exit through the mitered outlets of the pipes. The air suspension exiting from the upper inlet pipe impinges on the impingement means so that any foam therein is collapsed. As the air suspension loses its velocity, the liquids drop out and fall to the bottom of the vessel where they are drawn out of the vessel through the liquid outlet pipe. The separated air is sucked out of the vessel through the air outlet pipe.

It is an object of this invention to enable separation of fine sized solids from a liquid in a slurry by filtration after using a flocculating agent wherein the slurry and the flocculating agent are subjected to intense agitation and turbulent flow to form floccules.

It is another object of this invention to form fine solids in a slurry into relatively small size bead-like floccules so that, when the floccules are separated from the slurry in a filtering operation, the resulting cake is firm and relatively dry so that it may be readily removed from the filtering means.

It is a further object of this invention to form fine solids in slurry into floccules so that, when the floccules are separated from the slurry in a filtering operation, the resulting cake is relatively dry so that it may be readily removed from the filtering means using an additional unit in a conventional coal processing plant.

It is a further object of this invention to provide a complete filter system that can be mounted on a base and shipped by conventional flat bed trucks over the highways.

Additional objects, advantages, and novel features of the invention are set forth in part in the description which follows which will be understood by those skilled in the art upon examintion of the following or may be learned by practice of the invention. The objects and advantages of the invention may be realized and obtained by means of the instrumentalities and combinations particularly pointed out in the appended claims.

BRIEF DESCRIPTION OF THE INVENTIION

FIG. 4 is a graph illustrating the various degrees of agitation;

FIG. 15 is a top plan view of FIG. 14;

FIG. 16 is a top plan view of a vacuum receiver of this invention;

FIG. 17 is a front elevational view of FIG. 16 with parts in section;

FIG. 18 is a side elevational view of FIG. 16 of the inlet side;

FIG. 19 is a side elevational view of FIG. 16 of the water outlet side; and

FIGS. 20-22 are enlarged views of portions of FIG. 17.

DETAILED DESCRIPTION OF THE INVENTION

Figure 1:
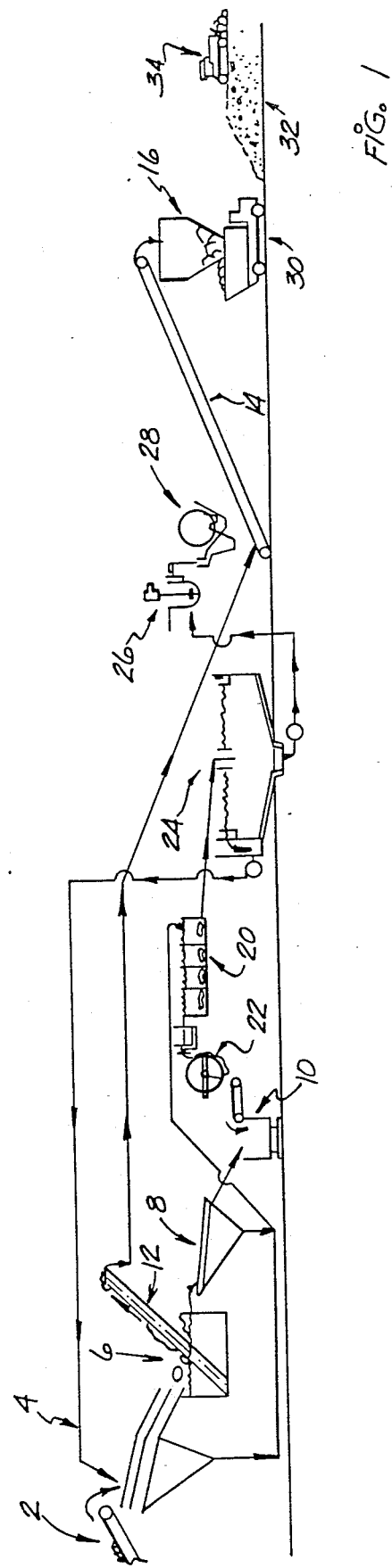
FIG. 1 is a schematic illustration of a flow diagram of a coal processing plant incorporating the invention.

In FIG. 1, there is schematically illustrated a flow diagram of a coal processing plant comprising a conveyor carrying run of the mine material and dumping the material into a unit 4 wherein the material is separated into a greater than 28 mesh size and a 28 mesh by zero size. The greater than 28 mesh material is fed into the jig 6 wherein water is used to separate the low ash coal from refuse, such as rock, slate and high ash disposable material. The separation is by specific gravity with the coal floating across the surface of the jig 6 and the refuse sinking to the bottom. The low ash coal is separated and fed into dewatering screens 8 and then into a rail car 10. The refuse is taken out of the jig 6 by conveyor 12 and transported to conveyor 14 and dumped int refuse truck bin 16.

The 28 mesh by zero size run of the mine material in a water slurry is drained from the unit 4 and fed into float cells 20 wherein the 28 mesh by zero size low ash coal is separated out and fed into a filter unit 22. Water and any fine size material contained therein is drained from the dewatering screens 8 and is also fed into the float cells 20. The dewatered 28 mesh by zero low ash coal is transferred from the filter unit 22 to the rail car 10. The 28 mesh by zero refuse sinks to the bottom of the float cells 20 and is transferred in slurry form to a thickener/clarifier 24. The thickened 28 mesh by zero refuse in slurry form is fed into a flocculator 26 wherein a flocculating agent is introduced into the slurry which is then subjected to intense agitation and turbulent flow so as to form the 28 mesh by zero refuse into floccules in a slurry and then fed into the refuse filter 28. The filter cake comprising the flocculated 28 mesh by zero refuse is removed from the filter and deposited onto the greater than size 28 mesh refuse on the conveyor belt 14 to be dumped into refuse truck bin 16. The refuse is dumped from refuse truck bin 16 into trucks 30 and transported to gob pile 32 wherein cats 34 push and level out the refuse in the gob pile. The height in the gob pile is initially 12 inches and is then compacted 4:1 to seal the gob pile from air to prevent spontaneous gob pile fires.

In one operation, the filter unit 28 was filtering the refuse at a rate of about 7 tons per hour prior to the installation of a flocculator 26 of this invention. After installation of the flocculator 26, the filter unit was filtering the refuse at a rate of about 15-20 tons per hour. This is significant since if the filter unit 2 in some cases cannot keep the solids pulled down in the thickener, the refuse filter 28 must be run after the shifts. This means that there is no coarse refuse on the conveyor 14 so that the 28 mesh by zero refuse cannot be intermixed with the coarse refuse and must go to the gob pile 32 alone which is not desirable. Also, in accordance with this invention, the filter cake on the filtering means is relatively firm and dry so that it is readily removed from the filtering means and is in a more preferred condition for deposition onto the gob pile.

Figure 3:
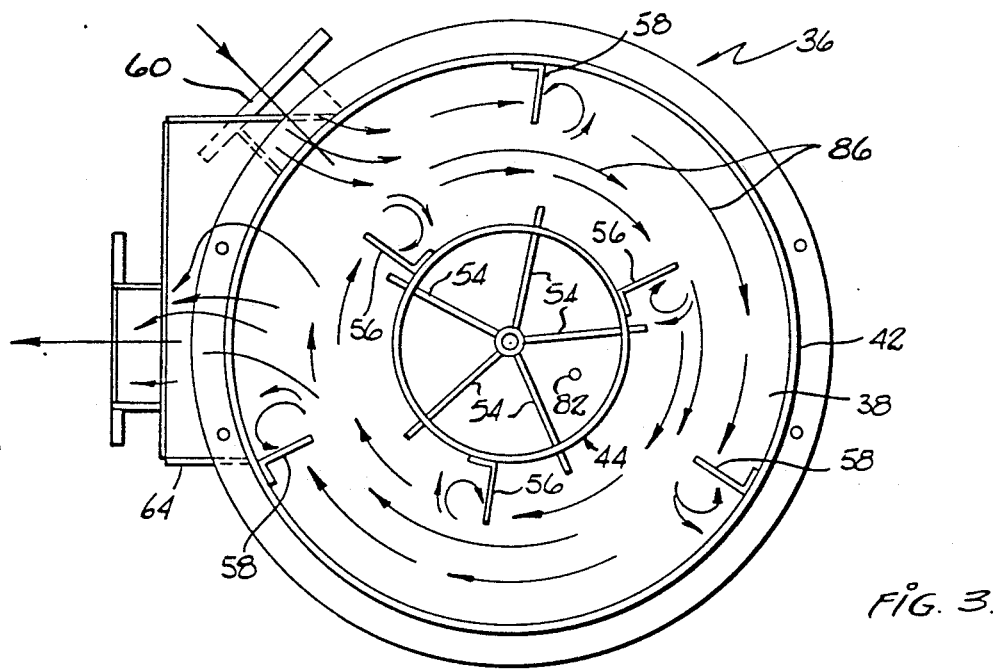
FIG. 3 is a top plan view of a portion of FIG. 2.
Figure 2:
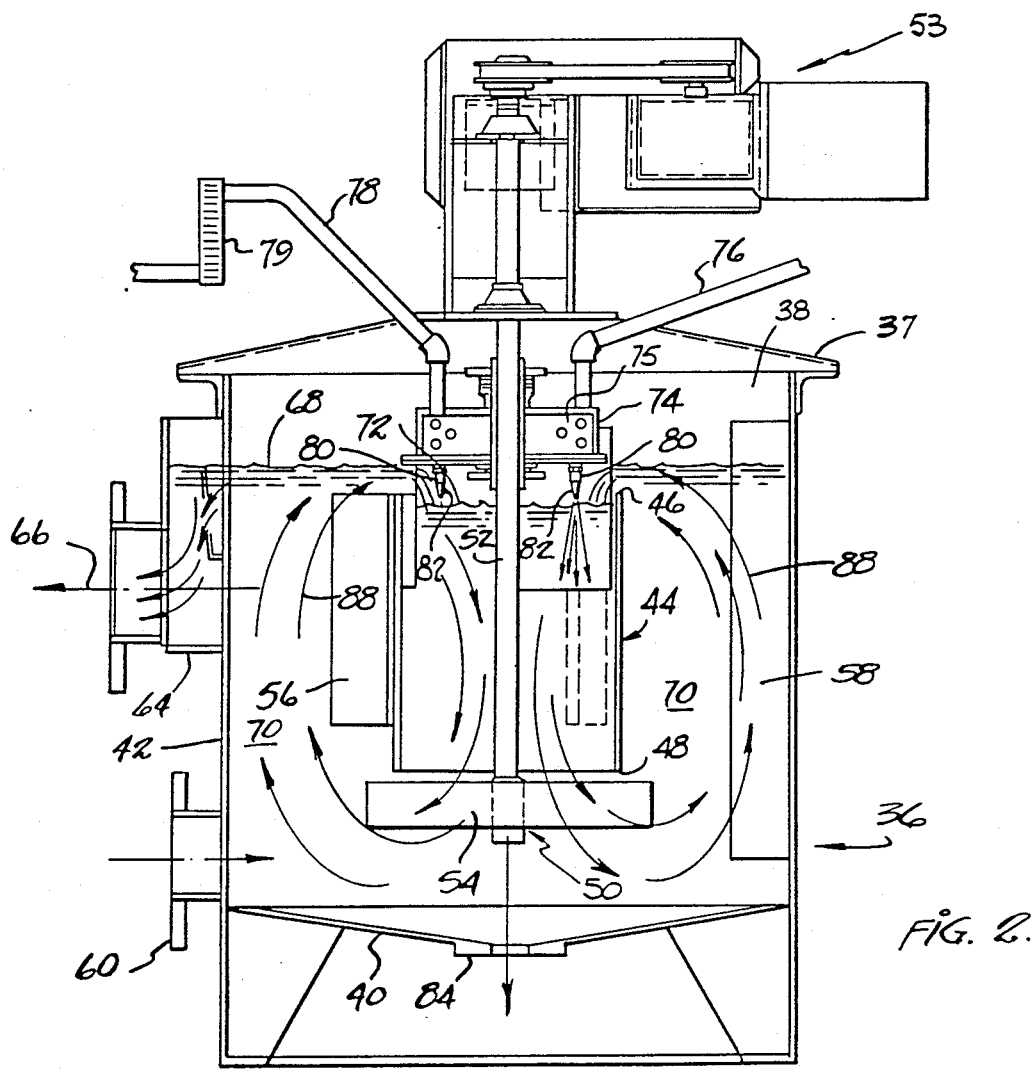
FIG. 2 is a schematic side elevational view of one embodiment of the invention.

In general, as shown in FIGS. 2 & 3, the flocculator apparatus 26 of the present invention comprises an overflow- type tank means 36 for continuously receiving a controlled amount of feed slurry through a slurry feed inlet means 60; and an overflow-type outlet means 64 for continuously removing an equal amount of flocculated slurry from the tank means for delivery to the filter 28. A cylindrical flow path separation means 44 is centrally mounted in the tank means with an open upper end portion 46 for enabling overflow from the tank means into the flow path separation means and an open lower end portion 48 for enabling downward flow into the tank means.

An agitation means 50 is mounted between the lower end portion of the flow path separation means and the bottom of the tank means for creating a zone of intense agitation by operation at relatively high tip speed and for establishing a continuous recirculation turbulent flow pattern in the tank means. Baffle means 56, 58 are provided on the tank side wall and on the flow path separation means for controlling the flow pattern. Flocculant delivery means 74 are provided adjacent the open upper end portion 46 of flow path separation means 44 for delivery of a dilute flocculant mixture into the flow path separation means for downward flow with the slurry toward the agitator means 50.

One embodiment of this invention is illustrated in FIGS. 2 and 3 and comprises a tank means or vessel 36 having a support bridge means 37 and a processing chamber 38 comprising having a bottom 40 and a side wall 42. A flow path separation means in the form of a cylinder 44 having an open top end 46 and an open bottom end 48 is positioned in the processing chamber 38 so that the open bottom end 48 is spaced from the bottom 40 of the processing chamber 38. A bladed agitation means 50, such as an impeller having vertical or slanted vanes or a propeller having shaped blades or other similar structure is located adjacent to and below the open bottom end 48. The bladed agitation means 50 is connected to a shaft 52 which can be rotated by suitable motor means 53. The blades 54 of the bladed means 50 are designed so as to cause continuous flow of the slurry in the tank and to move the material in the areas adjacent to the impeller 50 in a downward and circular direction. The rotation of the bladed means also induces the downward flow of the material within the cylinder 44 in such a manner that the level of the material within the cylinder 44 is below the level of the other material in the processing chamber 38 and the slurry in chamber 38 enters cylinder 44 by overflow. The diameter of the tip of the blades 54 is slightly greater than the inside diameter of the cylinder 44. The outer surface of the cylinder 44 is provided with a plurality of baffles 56 and the inner surface of the side wall 42 is provided with baffles 58 to dampen the circular flow of materials in the processing chamber 38 and cause a spiral circulating turblent flow pattern as discussed below.

An inlet 60 is located in a lower portion of the side wall 42 of the processing chamber 38. A feed slurry 62 containing the solids to be separated from the liquid is introduced into the processing chamber 38 through the inlet 60 at a controlled rate in an conventional manner. An outlet 64 is located in an upper portion of the side wall 42 of the processing chamber 38 for continuous delivery to the filter 28 in a conventional manner. A flocculated slurry 66 comprising the flocced bead-like floccules in a liquid is continuously removed from the processing chamber 38 through the outlet 64. The rate of slurry 62 introduction and flocculating agent introduction relative to the rate of slurry 66 extraction function to maintain the overflow level 68 of the material in the processing chamber 38 in a conventional manner. Because of the flocculating action, there are substantial differences in characteristics of the feed slurry 62 as compared to the characteristics of the outlet slurry 66 and, the volume 70 of material in the processing chamber 38 comprises many different types of slurry characteristics during processing. It is noted that the level 72 of the slurry volume 70 of within the cylinder 44 is slightly below the tank slurry level 68. As stated above, this is caused by the inducement of flow through the cylinder 44 by the rotation of the bladed means 50.

A flocculant feed blender 74 with shaft driven blades 75 is located in the processing chamber 38 and spaced above the slurry levels 68 and 72 in the processing chamber 38. A pipe 76 is used to feed a flocculating agent, such as an activated polymer mixture, having a concentration of about 0.5 percent by weight into the blender 74. A pipe 78 with suitable conventional flow control means is used to feed dilution water into the blender 74. A conventional flow meter 79 is used to control the amount of dilution water added. Suitable means such as circumferential flow passages 77 in blades 75, FIG. 2, are provided within the blender 74 so as to form a suitable intermixing of the flocculating agent and the dilution water in a concentration of less than 0.05 percent by weight. A plurality of tubes 80 extend from the blender 74 downwardly inside of the cylinder 44. The tubes 80 are provided with nozzles 82 adjacent to and above the slurry level 72 and the impeller 50. Although the nozzles 82 are preferably located as shown, it is within the scope of this invention to have the nozzles 82 located at any height within the cylinder 44. The inlet 60 is located in relation to the outlet 64 so that the circulatory portion of the flow path of the material moving through the vessel is generally less than 360 degrees. In a preferred embodiment of the invention, this circulatory portion of the flow path is about 315 degrees. A drain 84 is located in the bottom 40 for use when needed.

In accordance with this invention, the material being processed in the vessel flows in a continuous spiral and circulatory path while being subjected to turbulent flow motion. As illustrated by the arrows in FIGS. 2 & 3, the recirculating turbulent flow pattern comprises downward movement in flow path separation means 44, radial outward and downward movement between the bottom of flow path separation means and the bottom of the tank means, upward movement between the side walls of the flow path separation means and the tank means, radial inward movement from the upper portion of the tank means to the upper portion of the flow path separation means, and circumferential movement between the side walls of the flow path separation means and the tank means. When the process is in operation, a substantially constant volume of solids, flocculating agent and liquid is maintained in the vessel. A first feed slurry comprising solids in a liquid is introduced into the vessel through an inlet opening located in a lower portion of the vessel. A flocculating agent, such as a dilute mixture of an activated polymer, is introduced into the first slurry while in the vessel. Mechanical agitatior means 50 are provided to create forces in the vessel to cause movement of the slurry and the flocculating agent in a substantially continuous path from the inlet opening to an outlet opening located in an upper portion of the vessel while continuously flowing downwardly through flow path separation means 44 and being mixed with the flocculant in a zone of intense agitation adjacent agitation means 50. The substantially continuous path comprises a plurality of adjacent generally vertical spiral portions extending in a circulatory direction through an arc less than 360 degrees. The amount of the created forces necessary to cause the desired zone of intense agitation and the movement through the substantially continuous path also causes turbulent flow of the combined first slurry and flocculating agent during movement over the substantially continuous path. During the movement through the substantially continuous path, the flocculating agent acts on the solids in the first slurry to change the solids into floccules. While the size and shape of the floccules may vary, the process when used in a coal processing plant produced floccules that appeared to be relatively small and bead-like in configuration and provide exceptionally good cake formation at filter 28.

In the embodiment of the invention illustrated in FIGS. 2 and 3, this substantially continuous flow path with a zone of intense agitation and turbulent motion is produced by the combination of rotating the bladed means 50 so that the blades have a tip speed between about 300 and 600 feet per minute with the baffles 56 and 58 cooperating to form the combined spiral and circulatory path. In order to produce the proper intensity of agitation, the bladed means 50 should have a diameter which is between 30 and 60 percent of the inner diameter of the processing chamber 38. In one specific example of use of the embodiment illustrated in FIGS. 2 and 3 for the flocculation of 22×zero mesh coal slurry, the turbulent flow and flow path is obtained by rotating a bladed means 50 having 5 blades and a diameter of about 15 inches at a rate sufficient to produce a tip speed of each blade of about 500 feet per minute in a vessel having an inner diameter of about 30 inches. The cylinder 44 has an inner diameter of about 13 inches. The flocculating agent has a concentration of about 0.025 percent by weight. The height of the slurry material in the processing chamber 38 should be 60 to 85 percent of the diameter of the processing chamber 38. The slurry introduced into the processing chamber 38 should make at least three complete spiral paths while passing through a circulatory path of about 315 degrees between the inlet 60 and the outlet 64 with a retention time of about between 15 to 60 seconds. The spiral path includes downwardly moving portions within the cylinder 44 and vertically moving portions between the cylinder 44 and the outer wall of the processing chamber 38. The flocculating agent acts on the solids in the first slurry during movement through the substantially continuous path to change the solids into floccules. A processed flocculated slurry comprising the floccules in a liquid moves out of the vessel through the outlet opening and then into a filter unit wherein the floccules are separated from the liquid.

A graph in FIG. 4 depicts the various types of agitation produced by rotating various sizes of bladed means in the embodiment illustrated in FIGS. 2 and 3. The graph is a plot of impeller diameter and R.P.M. with impeller tip speed in feet per minute indicted by the curves and with the horsepower developed indicated by the numbers at the dots. The graph of FIG. 4 shows that a zone intense agitation with suitable of intense turbulent flow exists when the blades have a tip speed of between about 300 and 600 feet per minute.

The size of the flocculator depends on the amount of material to be processed. However, the establishment of a zone of intense agitation adjacent the agitator means and the creation of the desired continuous recirculating turbulent flow pattern can be accomplished by maintaining a desired tip speed which is a function of diameter of the agitator means and RPM. The design parameters for any given installation can be extrapolated from the illustrative embodiments described herein. In one specific example of use of the embodiment of a flocculator illustrated in FIGS. 2 and 3, a 28×zero mesh coal slurry 62 having a relatively high dense solids concentration of between about 35 and 45 percent by weight and preferably a concentration of about 40 percent by weight is introduced into the processing chamber 38 through inlet 60 at the rate of between about 100 and 240 gallons per minute and preferably at a rate of about 150 gallons per minute. A flocculating agent comprising a polymer mixture having a concentration of between 0.02 and 0.07 percent by weight and preferably a concentration of about 0.03 percent by weight is fed through the tubes 80 at a total rate of between about 25 and 35 gallons per minute and preferably at a rate of about 30 gallons per minute. A slurry 66 is extracted through the outlet at a rate of between about 125 and 275 gallons per minute and preferably at a rate of about 180 gallons per minute with a retention time of between about 15 to 60 seconds. The processing chamber 38 has an inside diameter of about 30 inches and the cylinder 44 has an inside diameter of about 12 inches. The impeller 50 has tip diameter of about 15 inches and the blades 54 are at an angle of about zero to the vertical. The baffles 56 extend outwardly from the cylinder 44 in a radial direction for a distance of about 6 inches and are 3 in number spaced 120 degrees apart. The baffles 58 extend inwardly from the side wall 42 in a radial direction for a distance of about 6 inches and are 3 in number spaced 120 degrees apart. The impeller 50 is rotated at a rate sufficient to produce a tip speed of between about 300 and 600 feet per minute and preferably a tip speed of about 500 feet per minute. Thus it is quite evident that there is an intense turbulent flow of the slurry and flocculating agent to produce the floccules. When the solids comprise a 28 mesh by zero refuse produced in a coal processing plant, the floccules are relatively small and appear to be bead-like in shape.

Figure 6:
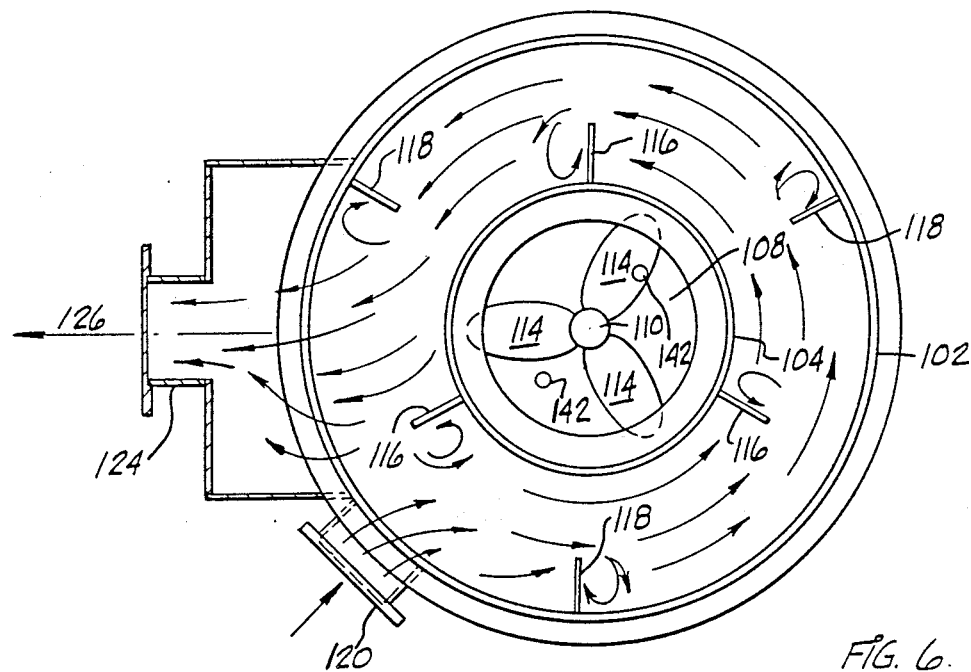
FIG. 6 is a top plan view of a portion of FIG. 5.
Figure 5:
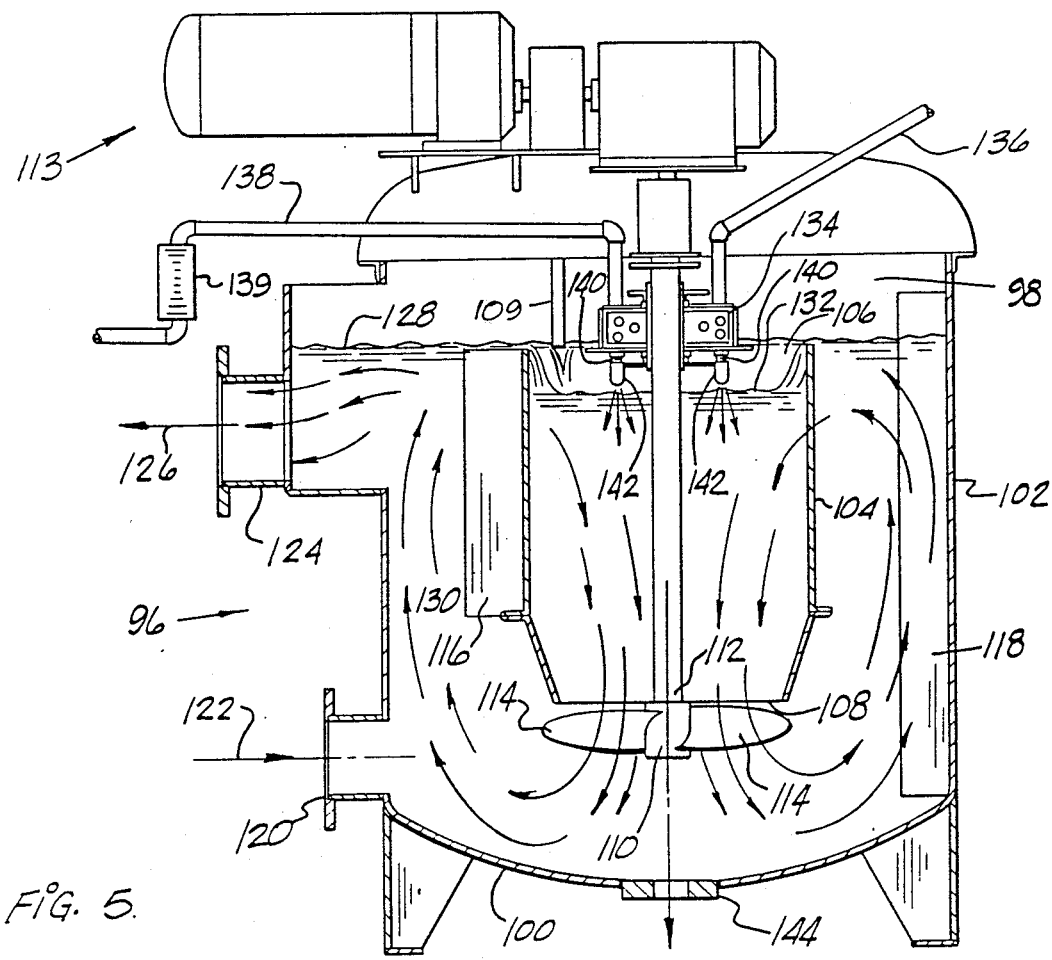
FIG. 5 is a schematic side elevational view of another embodiment of the invention.

Another embodiment of this invention is illustrated in FIGS. 5 and 6 and comprises a vessel 96 comprising a flocculation tank or processing chamber 98, having a bottom 100 and a side wall 102. A cylinder 104 having a support bridge means 99, an open top end 106 and an open bottom end 108 is positioned in the processing chamber 98 by suitable support bracket means 109 so that the open bottom end 108 is spaced from the bottom 100 of the processing chamber 98. The inside diameter of the cylinder 104 is greater than one-half the inside diameter of the processing chamber 98. A bladed means 110, such as a propeller having shaped blades, is located adjacent to and below the open bottom end 108. The bladed means 110 is connected to a shaft 112 which can be rotated by suitable motor means 113. The blades 114 of the bladed means 110 are designed so as to move the material in the areas adjacent to the bladed means in a downward and circular direction. The rotation of the bladed means also induces the flow of the material within the cylinder 104 in such a manner that the level of the material within the cylinder 104 is below the level of the other material in the processing chamber 98. The diameter of the tip of the blades 114 is slightly greater than the inside diameter of the cylinder 104. The outer surface of the cylinder 104 is provided with a plurality of baffles 116 and the inner surface of the side wall 102 is provided with baffles 118 to dampen the circular flow of materials in the processing chamber 98 and cause a spiral circulating flow pattern as discussed above.

An inlet 120 is located in a lower portion of the side wall 102 adjacent to the bottom 100 of the processing chamber 98. A slurry 122 containing the solids to be separated from the liquid is introduced into the processing chamber 98 through the inlet 120. An outlet 124 is located in the side wall 102 adjacent to the upper portion of the processing chamber 98. A slurry 126 comprising floccules in a liquid is extracted from the processing chamber 98 through the outlet 124. The rate of slurry 122 introduction and flocculating agent introduction relative to the rate of slurry 126 extraction function to maintain the level 128 of the material in the processing chamber 98. It is noted that the level 132 of the volume 130 of material within the cylinder 104 is slightly below the level 128. As stated above, this is caused by the inducement of flow through the cylinder 104 by the rotation of the bladed means 110.

A flocculent blender 134 is located in the processing chamber 98 and spaced above the levels 129 and 132 in the processing chamber 98. A pipe 136 is used to feed a flocculating agent, such as an activated polymer mixture, having a concentration of about 0.5 percent by weight into the blender 134. A pipe 138 is used to feed dilution water into the blender 134. A flow meter 139 is used to control the amount of dilution water added. Suitable means in the form of circumferential inlet passages 137, FIG. 5, are provided within the blender 134 so as to form a suitable intermixing of the flocculating agent and the dilution water so that the flocculating agent used in the process has a concentration of less than 0.5 percent by weight. A plurality of tubes 140 extend from the blender 134 downwardly inside of the cylinder 104. The tubes 140 are provided with nozzles 142 adjacent to and above the level 132 of material in the cylinder 104. Although the nozzles 142 are preferably located as shown, it is within the scope of this invention to have the nozzles 142 located at any height within the cylinder 104 and even submerged in the material within the cylinder 104. The inlet 120 is located in circumferentially spaced relation to the outlet 124 so that the circulatory portion of the flow path of the material moving through the vessel is less than 360 degrees. In a preferred embodiment of the invention, this circulatory portion of the flow path is about 315 degrees. A drain 144 is located in the bottom 100 for use when needed.

The embodiment of the invention illustrated in FIGS. 5 and 6 operates in a manner similar to the embodiment illustrated in FIGS. 2 and 3 in that the material being processed in the vessel flows in a continuous spiral and circulatory path while being subjected to a zone of intense agitation and intense turbulent flow.

Figure 7:
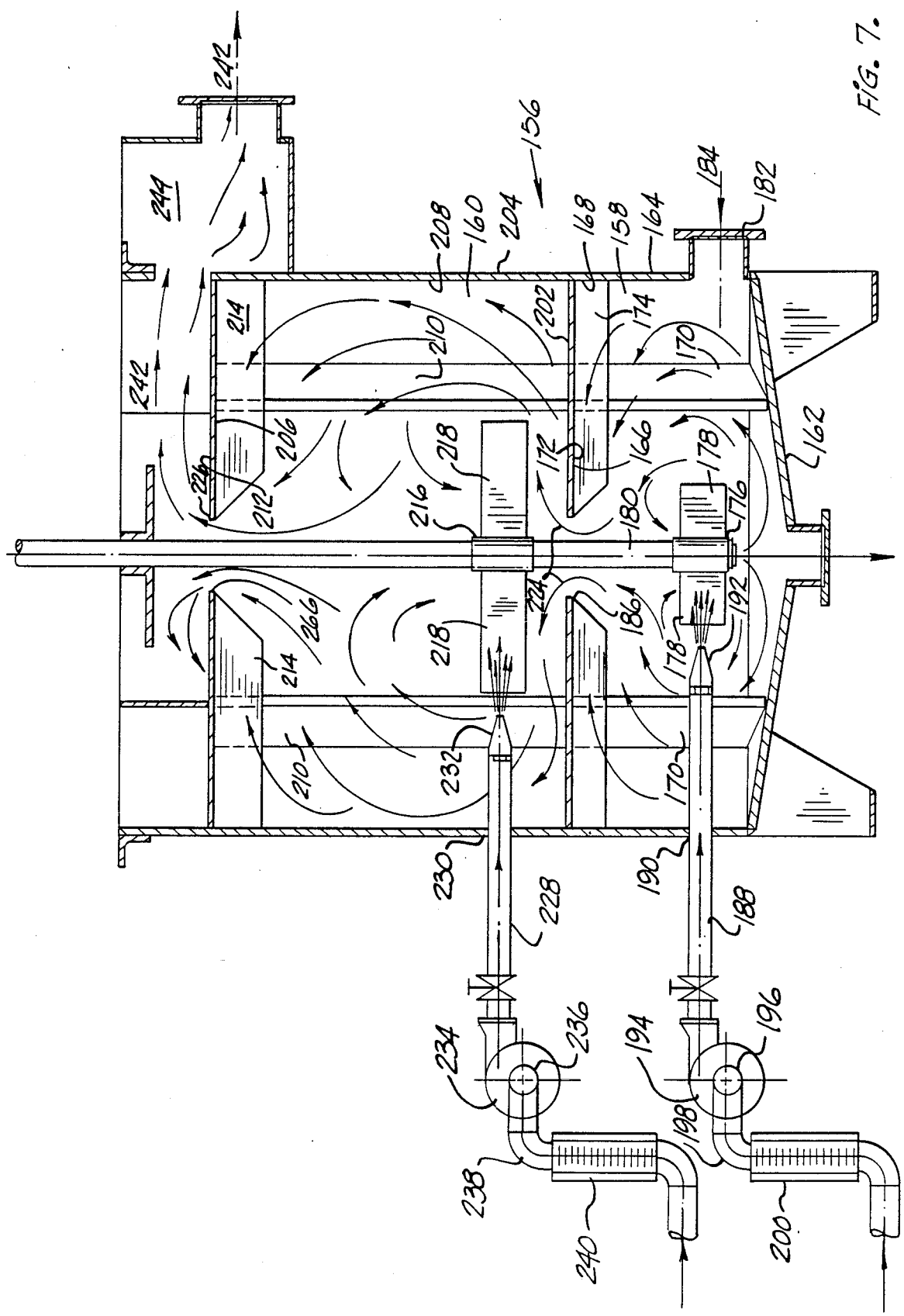
FIG. 7 is a schematic side elevational view of another embodiment of the invention.
Figure 8:
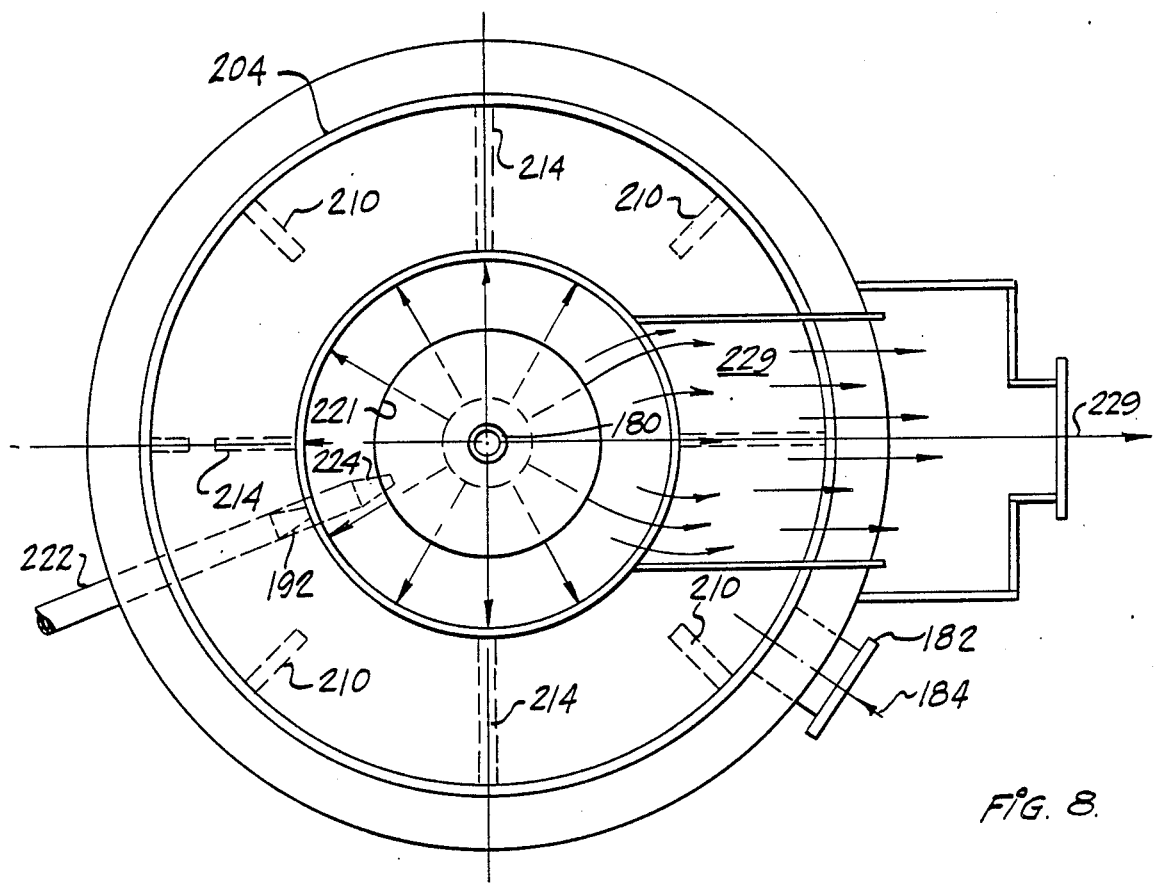
FIG. 8 is a top plan view of a portion of FIG. 7.

Another embodiment of the invention is illustrated in FIGS. 7 and 8 and comprises a vessel 156 having a first processing chamber 158 and a second processing chamber 160. The first processing chamber 158 has a bottom 162, a side wall 164 and a top wall 166. The inner surface 168 of the side wall 164 is provided with baffles 170 and the bottom surface 172 of the top wall 166 is provided with baffles 174. A bladed means 176, such as an impeller having blades 178 which are at zero degrees to the vertical, is located in a central portion of the first processing chamber 158 and is spaced closer to the bottom 162 than to the top wall 166. The bladed means 176 is secured to the shaft 180 for rotation therewith. Conventional means (not shown) are used to rotate the shaft 180.

An inlet opening 182 is located in a lower portion of the side wall 164 of the processing chamber 158. A feed slurry 184 containing the solids to be separated from the liquid is introduced into the processing chamber 158 through the inlet opening 182. An outlet opening 186 is located in a central portion of the top wall 166. A pipe 188 extends through an opening 190 in the side wall 164 and terminates in a nozzle 192 which is adjacent to but spaced slightly from the path of rotation of the tip of the blades 178. A flocculating agent having a concentration of about 0.5 percent by weight is fed into a blender 194 through a pipe 196. Dilution water is fed into the blender 194 through a pipe 198. A flow meter 200 controls the amount of dilution water. As will be described below, a slurry comprising solids in an initial stage of flocculation in a liquid flows from the first processing chamber 158 through the outlet opening 186 into the second processing chamber 160.

The second processing chamber 160 has a bottom comprising the upper surface 202 of the top wall 166, a side wall 204 and a top wall 206. The inner surface 208 of the side wall 204 is provided with baffles 210 and the bottom surface 212 of the top wall 206 is provided with baffles 214. A bladed means 216, such as an impeller having blades 218 which are at zero degrees to the vertical, is located in a central portion of the second processing chamber 160 and is spaced closer to the bottom 202 than to the top wall 206. The bladed means 216 is secured to an extension of the shaft 180 for rotation therewith.

A slurry 220 comprising the solids in an initial stage of flocculation in a liquid is introduced into the processing chamber 160 through the opening 186. An outlet opening 221 is located in a central portion of the top wall 206. A pipe 222 extends through an opening 223 in the side wall 204 and terminates in a nozzle 224 which is adjacent to but spaced slightly from the path of rotation of the tip of the blades 218. A flocculating agent having a concentration of about 0.5 percent by weight is fed into a blender 225 through a pipe 226. Dilution water is fed into the blender 225 through a pipe 227. A flow meter 228 controls the amount of dilution water. As will be described below, a slurry 229 comprising floccules in a liquid flows out of the second processing chamber 160 through the outlet 221 into an overflow well 230 and then out of the vessel 156 through an outlet opening. The slurry is transported to a filtering means such as the refuse filter 28 wherein the floccules are separated from the liquid.

In this embodiment of the invention, the material being processed in each of the first and second processing chambers flows in a continuous spiral and circulatory path. However, as explained below, the amount of agitation is different in each of the processing chambers. When the process is in operation, a substantially constant volume of solids, flocculating agent and liquid is maintained in the first and second processing chambers. In fact, in the embodiment illustrated in FIGS. 7 and 8, each of the processing chambers is substantially full.

In operation, the shaft 180 is rotated so that the bladed means 176 is also rotated. As the blades 178 move through the volume of material in the first processing chamber, they impart downward and circular forces on the material in the vicinity of their zone of rotation. These forces plus the flow retarding forces produced by the baffles 170 and 174 cause the volume of material in the first processing chamber 158 to move in a continuous spiral and circulatory path. A flocculating agent, comprising a dilute mixture of an activated polymer having a concentration of less than 0.05 percent by weight, is sprayed out of the nozzles 198 into the zone of the path of blades 178 and is mixed with the solids and liquid from the slurry 184 and flows therewith in the continuous spiral and circulatory path. During the movement in the continuous spiral circulatory path the flocculating agent causes the solids in the slurry to advance into an initial stage of flocculation. The shaft 180 is rotated at a rate sufficient to produce a tip speed of each blade of lower bladed means 176 of less than 240 feet per minute, which causes only gentle turbulence in the material being processed. A slurry 224 comprising the solids in the initial stage of flocculation in a liquid flows out of the first processing chamber 158 and into the second processing chamber 160.

The rotation of the shaft 180 also rotates the bladed means 216. As the blades 218 move through the volume of material in the second processing chamber 158, they impart downward and circular forces on the material in the vicinity of their zone of rotation. Since the blades 218 have a diameter substantially greater than the diameter of the blades 178 and are rotated at the same rate, the tip speed of each blade 218 is substantially greater than the tip speed of each blade 178 so that the downward and circular forces are also substantially greater. The tip speed of each blade 218 is about 500 feet per minute which causes a zone of intense mechanical agitation and intense turbulent flow in the material being processed in the second processing chamber 160. A flocculating agent, comprising a dilute mixture of an activated polymer having a concentration of less than 0.05 percent by weight, is sprayed out of the nozzles 224 into the zone of the path of the blades 218 and is mixed with the slurry comprising the solids in the initial stage of flocculation. The downward and circulatory forces produced by the blades 218 cooperate with the flow retarding forces produced by the baffles 210 and 214 to produce a continuous spiral and circulatory path for the material being processed in the second processing chamber 160. The mixed flocculating agent and the solids in the initial stage of flocculation flow in this spiral and circulatory path and during this movement the flocculating agent acts on the solids in the initial stage of flocculation to produce floccules. A slurry 229 comprising the floccules in a liquid flows out of the second processing chamber and into an overflow well 230 and then moves out of the vessel 156 through the outlet opening 229 to a conventional filter unit.

The flocculating agent used in the first processing chamber 158 is preferably catonic so as to cause the solids to change into an initial stage of flocculation. The flocculating agent used in the second processing chamber 160 is preferably anionic so as to produce the desired floccules.

Figure 9:
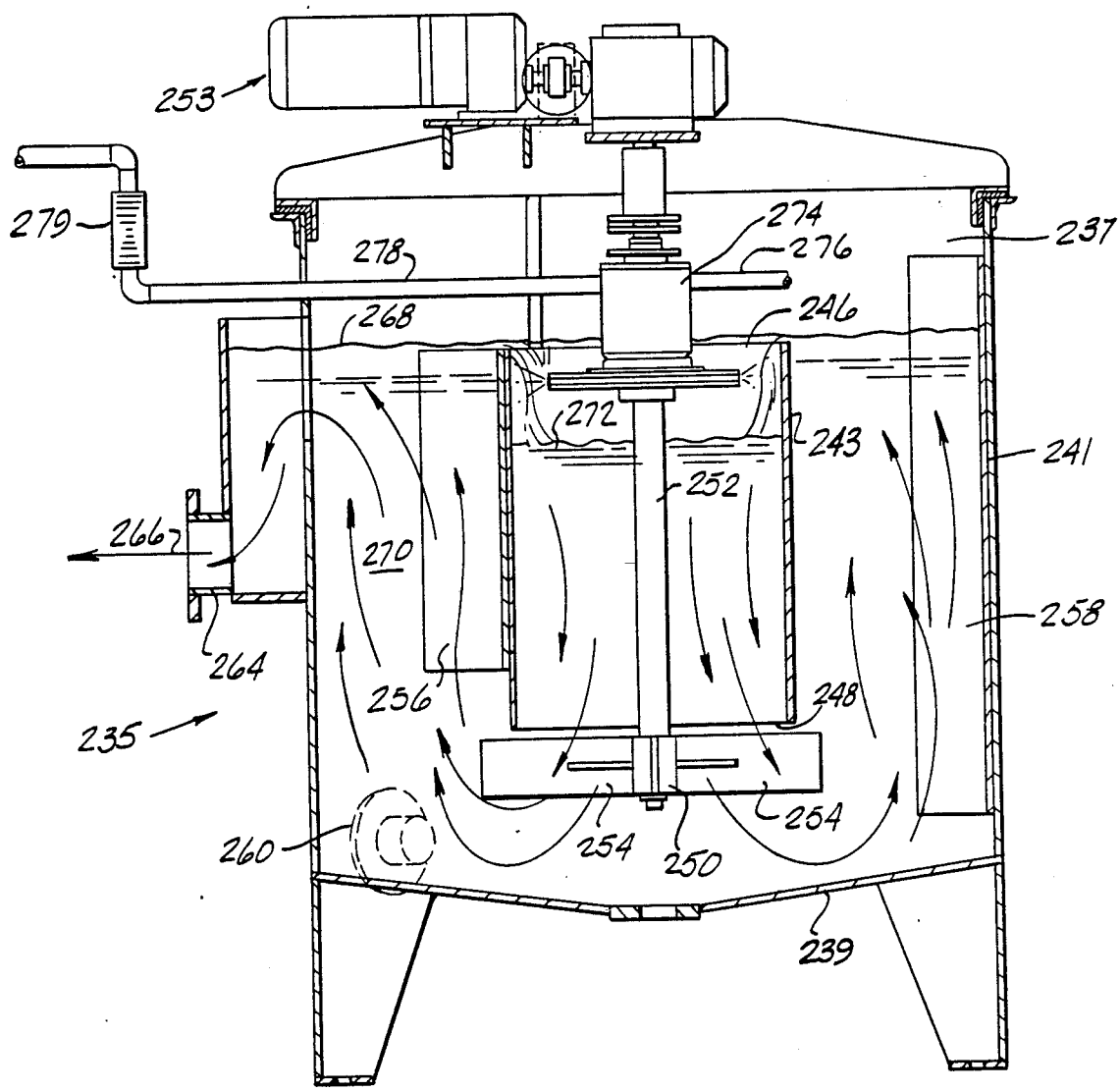
FIG. 9 is a schematic side elevational view of another embodiment of the invention.
Figure 10:
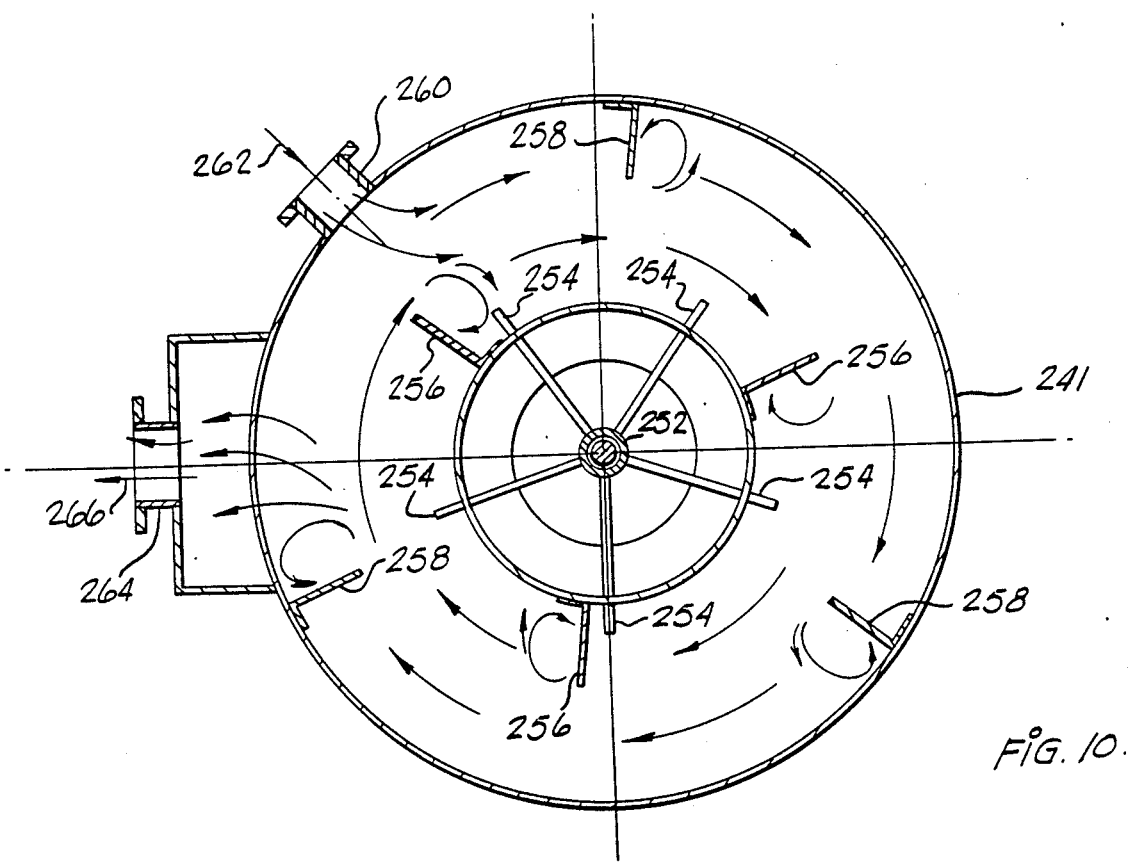
FIG. 10 is a top plan view of a portion of FIG. 9.

One embodiment of this invention is illustrated in FIGS. 9 and 10 and comprises a vessel 235 having a processing chamber 237 having a bottom 239 and a side wall 241. A cylinder 243 having an open top end 246 and an open bottom end 248 is positioned in the processing chamber 237 s that the ope bottom end 248 is spaced from the bottom 239 of the processing chamber 237. A bladed means 250, such as an impeller having vertical or slanted vanes or a propeller having shaped blades or other similar structure, is located adjacent to and below the open bottom end 248. The bladed means 250 is connected to a shaft 252 which can be rotated by suitable means 253. The blades 254 of the bladed means 250 are designed so as to move the material in the areas adjacent to the impeller 250 in a downward and circular direction. The rotation of the bladed means also induces the flow of the material within the cylinder 243 in such a manner that the level of the material within the cylinder 243 is below the level of the other material in the processing chamber 237. The diameter of the tip of the blades 254 is slightly greater than the inside diameter of the cylinder 243. The outer surface of the cylinder 243 is provided with a plurality of baffles 256 and the inner surface of the side wall 241 is provided with baffles 25 to dampen the circular flow of materials in the processing chamber 238 and cause a spiral circulating flow pattern as discussed above.

An inlet 260 is located in a lower portion of the side wall 241 of the processing chamber 237. A slurry 262 containing the solids to be separated from the liquid is introduced into the processing chamber 237 through the inlet 260. An outlet 264 is located in an upper portion of the side wall 241 of the processing chamber 237. A slurry 266 comprising the flocced bead-like floccules in a liquid is extracted from the processing chamber 237 through the outlet 264. The rate of slurry 262 introduction and flocculating agent introduction relative to the rate of slurry 266 extraction function to maintain the level 268 of the material in the processing chamber 237. It is noted that the level 272 of the volume 270 of slurries within the cylinder 243 is slightly below the level 268. As stated above, this is caused by the inducement of flow through the cylinder 243 by the rotation of the bladed means 250.

A flocculant blender 274 is located in the processing chamber 237 and spaced above the levels 268 and 272 in the processing chamber 237. A pipe 276 is used to feed a flocculating agent, such as an activated polymer mixture having a concentration of about 0.5 percent by weight, into the blender 274. A pipe 278 is used to feed dilution water into the blender 274. A flow meter 279 is used to control the amount of dilution water added.

Suitable means (not shown) are provided within the blender 274 so as to form a suitable intermixing of the flocculating agent and the dilution water so that the flocculating agent used in the process has a concentration of between 0.02 and 0.07 percent by weight.

Figure 11:
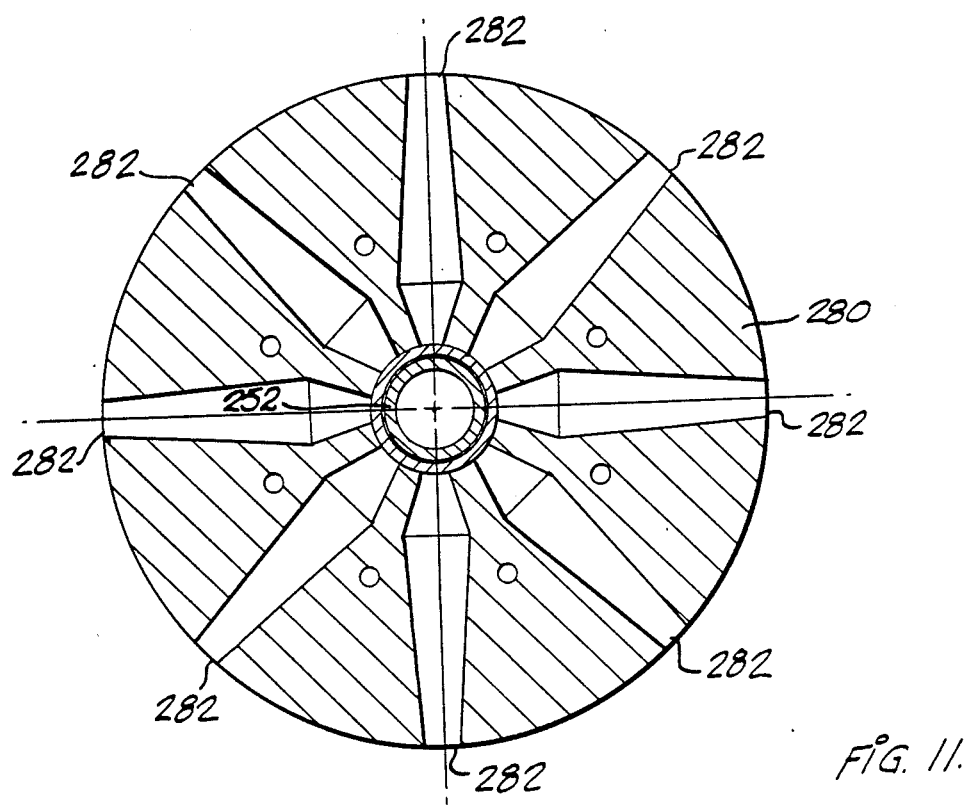
FIG. 11 is an enlarged view with parts in section of a means for distributing a flocculating agent.

A flocculant mixture dispersing means is illustrated specifically in FIG. 11 and comprises a disk 280 which is mounted on the shaft 252 for rotation therewith. A plurality of nozzles 282 are formed in the disk 280. The disk 280 receives the diluted flocculating agent from the blender 274 and distributes it outwardly through the nozzles 282. The disk is mounted on the shaft 252 so that when the disk is rotated, the diluted flocculating agent will flow through the nozzles 282 and be dispersed therefrom into the curtain of material flowing from the level 268 to the level 272. In this manner, the flocculating agent is widely dispersed in the slurry so as to readily contact the solids therein. The flocculating agent exits the nozzles 282 at a pressure of between about 10 and 20 pounds per square inch.

The embodiment of the invention illustrated in FIGS. 9-11 operates in a manner similar to the embodiments in FIGS. 2, 3, 5 and 6 in that the material being processed in the vessel flows in a continuous spiral and circulatory path while being subjected to intense agitation and turbulent flow. It is noted that the flow of material in FIGS. 2, 3, 9 and 10 is illustrated as being clockwise while the flow of material in FIGS. 5 and 6 is counterclockwise. The reason for this is the location of the inlet opening relative to the outlet opening. The circumferential length circulatory portion of the continuous spiral and circulatory path between the inlet and outlet openings is less than 360 degrees. In each of the embodiments illustrated in FIGS. 2, 3, 5 and 6 and 9-11, the circulatory portion of the continuous spiral and circulatory path is about 315 degrees.

Figure 12:
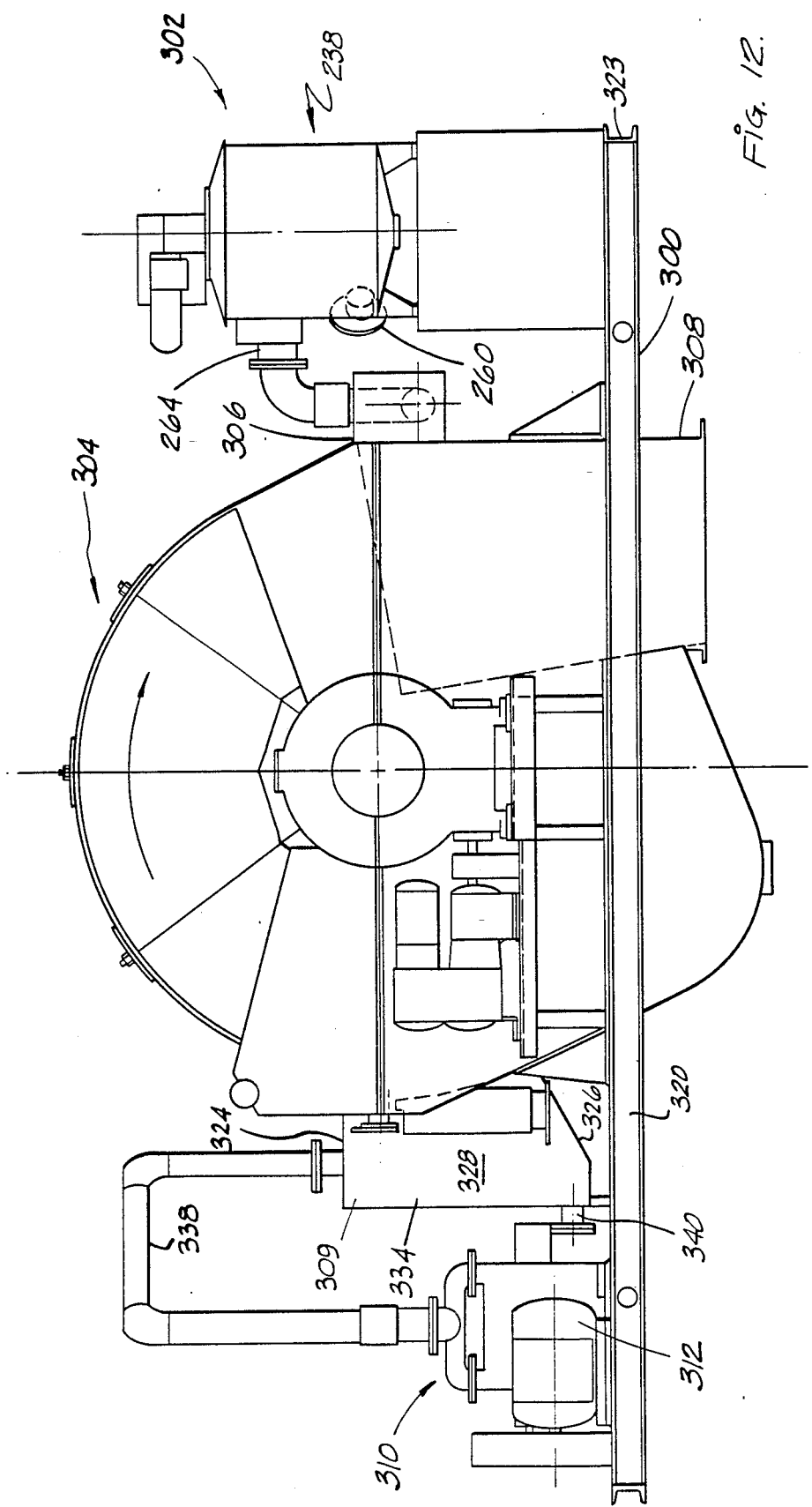
FIG. 12 is a schematic side elevational view of the components of this invention mounted on a common support platform.
Figure 13:
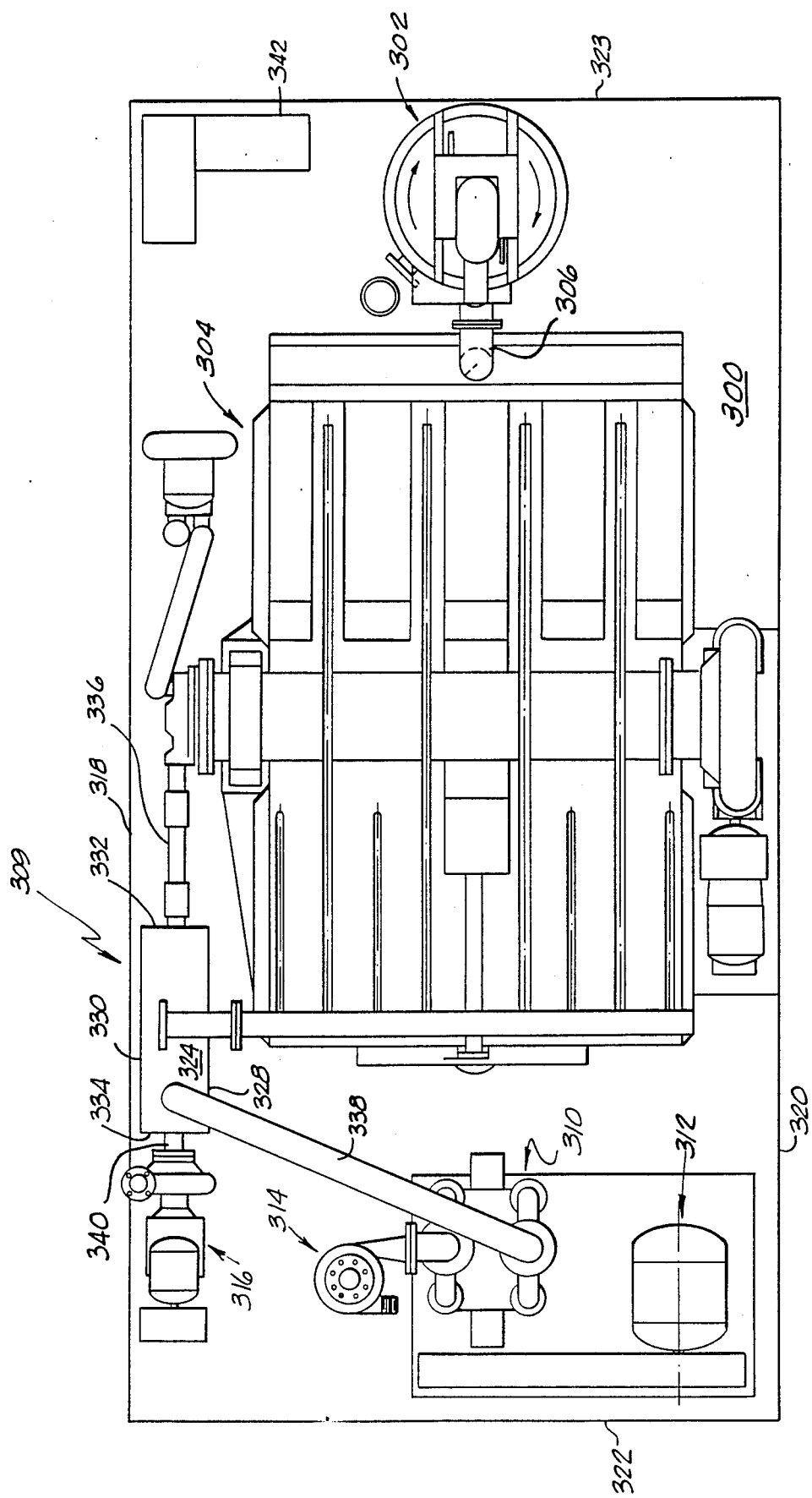
FIG. 13 is a top plan view of FIG. 12.

In FIGS. 12 and 13, there is illustrated a complete filter system for processing a slurry comprising solids in a liquid into a filter cake comprising floccules formed in accordance with the inventive concepts in this application. A base or support platform 300 is provided for supporting all of the required equipment. A flocculating unit 302 is similar to that illustrated in FIGS. 9-11. The slurry comprising solids in a liquid is introduced into the vessel 235 through the inlet opening 26 and the slurry comprising the floccules in a liquid exits through the outlet opening 264. A commercially available filtering unit 304, such as Peterson 8'-10"×4 disc filter marketed by Peterson Filter Corporation, is mounted on the base 300 or support platform. The slurry comprising the floccules in a liquid is introduced into the filter unit 304 through the inlet means 306 and is processed in a conventional manner and a filter cake is discharged through the discharge means 308. A vacuum receiver means 309 is mounted on the base or support platform 300 adjacent to the filtering unit 304. A wet ring vacuum pump 310 is also mounted on the base or support platform 300 and is used to supply the vacuum required for the operation of the filter unit 304 and the vacuum receiver 309. Also mounted on the base or support platform 300 are a device motor means 312, a discharge silencer 314 and a filtrate pump means 316 for removing liquid from the vacuum receiver 309. The base or support platform 300 is rectangularly shaped and has a pair of laterally opposite relatively long side edge surfaces 318 and 320 and a pair of laterally opposite side edge surfaces 322 and 323. The vacuum receiver 309 has top wall portion 324, bottom wall portion 326, front wall portion 328, back wall portion 330, first side wall portion 332 and second side wall portion 334. Pipe means 336 function to transfer an air suspension of filtrate from the filter unit 304 to the vacuum receiver 309. Pipe means 338 connect the vacuum receiver 309 to the vacuum pump unit 310 for forming a vacuum in the vacuum receiver 309. Pipe means 340 connect the vacuum receiver 309 to the pump 316 so that filtrate may be removed from the vacuum receiver 309. A variable frequency speed control station 342 is also mounted on the base or support platform 300. The base or support platform 300 is 20 feet long and 10 feet wide and the lifting weight is approximately 20,400 pounds so that the complete assembly may be readily transported.

In summary, the invention enables efficient continuous high volume filtration-type processing of dense highly concentrated relatively fine, small-size mineral particles in a slurry in a relatively small-size flocculation tank by use of highly dilute flocculant material with a relatively fast feed flow rate and relatively short retention time by mechanical agitation at relatively high tip speed to produce a zone of intense mechanical agitation and a continuous circulatory turbulent flow path in the flocculating tank.

Figure 14:
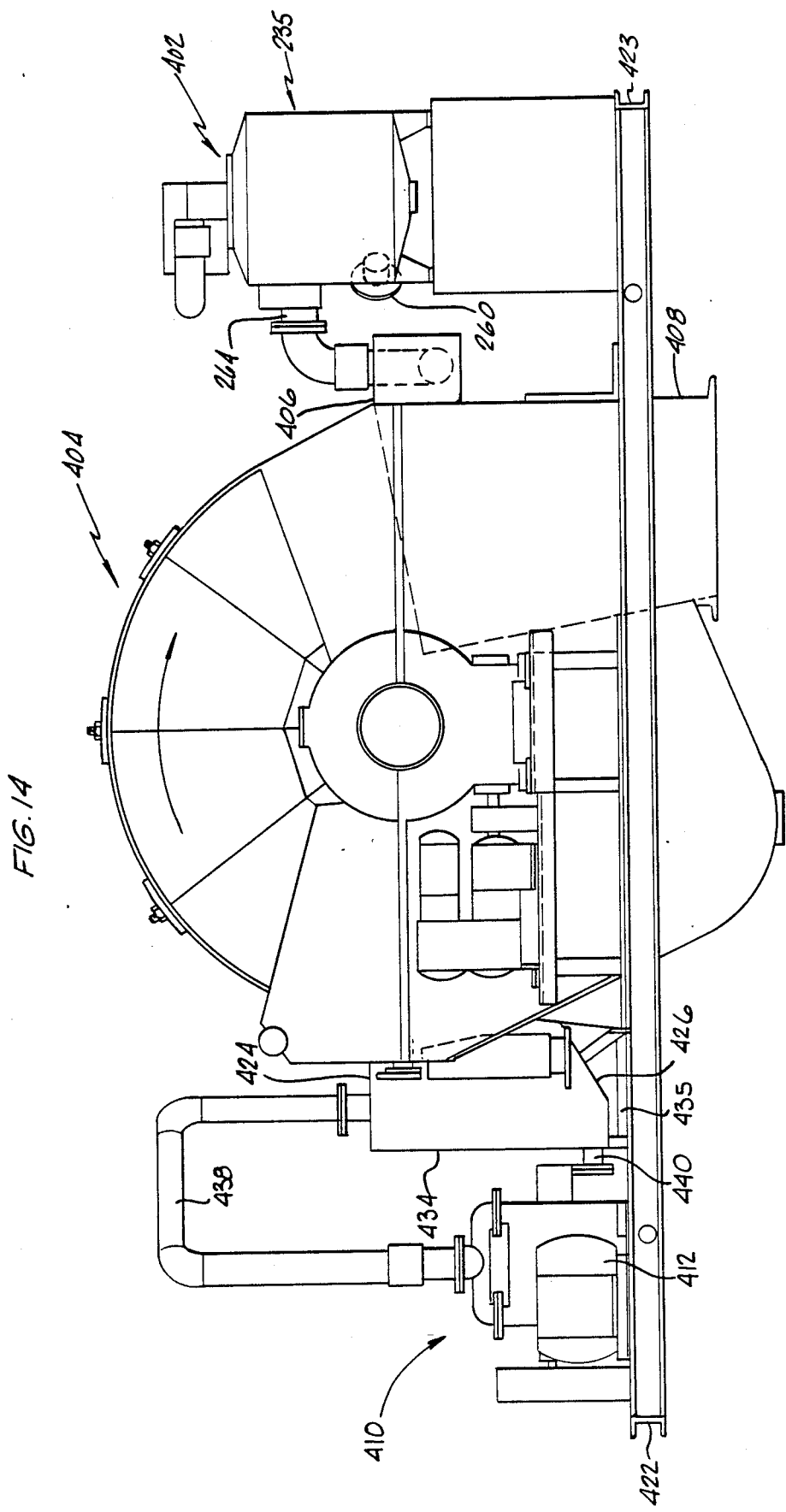
FIG. 14 is a schematic side elevational view of the components of a modified form of this invention mounted on a common support platform.

In FIGS. 14 and 15, there is illustrated a complete filter system for processing a slurry comprising solids in a liquid into a filter cake comprising floccules formed in accordance with the inventive concepts in this application. A base or support platform, 400 is provided for supporting all of the required equipment. A flocculating unit 402 is similar to that illustrated in FIGS. 9-11. The slurry comprising solids in a liquid is introduced into the vessel 235 through the inlet opening 260 and the slurry comprising the floccules in a liquid exits through the outlet opening 264. A filter unit 404, such as Peterson 8'-10"×4 disc filter marketed by Peterson Filter Corporation, is mounted on the base or support platform 400. The slurry comprising the floccules in a liquid is introduced into the filter unit 404 through the inlet means 406 and is processed in a conventional manner and a filter cake is discharged through the discharge means 408. A vacuum receiver 409 is mounted on the base or support platform 400 adjacent to the filtering unit 404. A wet ring vacuum pump 410 is also mounted on the base or support platform 400 and is used to supply the vacuum required for the operation of the filter unit 404 and the vacuum receiver 409. Also mounted on the base or support platform 400 are a device motor 412, a discharge silencer 414 and a filtrate pump 416 for removing filtrate from the vacuum receiver 409. The base or support platform 400 is rectangularly shaped and has a pair of laterally opposite relatively long side edge surfaces 418 and 420 and a pair of laterally opposite side edge surfaces 422 and 423. The vacuum receiver 409 has top wall portion 424, bottom wall portion 426, front wall portion 428, back wall portion 430, first side wall portion 432, second side wall portion 434 and a base 435. Pipe means 436 functions to transfer an air suspension of filtrate from the filtering unit 404 to the vacuum receiver 409. Pipe means 438 connect the vacuum receiver 409 to the vacuum pump unit 410 for forming a vacuum in the vacuum receiver 409. Pipe means 440 connect the vacuum receiver 409 to the pump 416 so that filtrate may be removed from the vacuum receiver 409. A variable frequency speed control station 442 is also mounted on the base or support platform 400. The base or support platform 400 is 20 feet long and 10 feet wide and the lifting weight is approximately 20,400 pounds so that the complete assembly may be readily transported.

A vacuum receiver 409 is illustrated in FIGS. 16–22 and comprises a vessel 502 having a plurality of flat wall portions formed from quarter inch sheet steel. The vessel 502 has a top wall portion 504, a bottom wall portion 506, a front wall portion 508, a back wall portion 510, a first side wall portion 512, a second side wall portion 514 and a base 516. The contacting edges of the flat wall portions are joined together by suitable means as described below.

L shaped angle sections 518, 520, 522, 524 and 526 have one of their relatively perpendicular legs secured to the front wall portion 508 close to the perimeter thereof by suitable means, such as by welding, and the other of their relatively perpendicular legs secured, respectively to the contacting portions of the top wall portion 4, the first side wall portion 512, the bottom wall portion 506 and the second side wall portion 514. An L shaped angle section 528 extends diagonally across the front wall portion 8 and is secured thereto by suitable means such as by welding. A portion 530 of the L shaped angle section 528 extends past the perimeter of the front wall portion 508 and is secured to the base 516. L shaped angled sections 532, 534, 536, 538 and 540 have one of their relatively perpendicular legs secured to the back wall portion 510 close to the perimeter thereof and the other of their relatively perpendicular legs secured respectively to the contacting portions of the top wall portion 504, the first side wall portion 512, the bottom wall portion 506 and the second side wall portion 514 by suitable means such as by welding. Also, an L shaped angle section 542 extends diagonally across the back wall portion 510 and is secured thereto by suitable means such as by welding. A portion 544 of the L shaped angle section 542 extends past the perimeter of the back wall section 510 and is secured to the base 516. A portion 546 of the L shaped angle section 526 extends past the perimeter of the front wall portion 508 and is secured to the base 516 by suitable means such as by welding. Also, a portion 548 of the L shaped angle section 540 extends past the perimeter of the back wall portion 510 and is secured to the base 516 by suitable means such as by welding.

L shaped angle portion 550 has one of its relatively perpendicular legs secured to a portion of the first side wall portion 512 by welding and extends between and is in contact with the adjacent edges of the L shaped angle sections 520 and 534. The other of the relatively perpendicular legs of the L shaped angle section 550 is secured to a portion of the top wall portion 504 by welding and extends between and is in contact with adjacent edges of the L shaped angle sections 518 and 532.

A plate 552, FIG. 18, extends between and is in contact with the adjacent edges of the L shaped angle sections 520 and 534 and is secured to the first side wall section 512 by welding. A plate 554, FIG. 18, extends between and is in contact with adjacent edges of the L shaped angle sections 522 and 536 and is secured to the bottom wall portion 506 by welding. A plate 556, FIG. 18, extends between and is in contact with the adjacent edges of the L shaped angle sections 522 and 536 and is secured to the bottom wall portion 506 by welding.

L shaped angle portion 558, FIG. 4, has one of its relatively perpendicular legs secured to a portion of the second side wall portion 514 by welding and extends between and is in contact with adjacent edges of the L shaped sections 526 and 540. In FIG. 16, the other of the relatively perpendicular legs of the L shaped angle section 558 is secured to the top wall portion 504 by welding and extends between and is in contact with adjacent edges of the L shaped sections 518 and 532.

L shaped angle portion 560, FIG. 19, has one of its relatively perpendicular legs secured to a portion of the second side wall portion 514 by welding and extends between and is in contact with adjacent edges of the L shaped sections 526 and 540. The other of the relatively perpendicular legs of the L shaped angle section 558 is secured to the bottom wall portion 506 by welding and extends between and is in contact with adjacent edges of the L shaped sections 524 and 536 (not shown).

The various L shaped angle sections and the plates provide reinforcing means for the various wall portions to counteract the inwardly directed forces acting thereon because of the vacuum within the vessel 502.

The vacuum receiver means 502 is connected to the filter unit 404 by a pair of vertically spaced apart inlet pipes 562 and 564 pass through openings 566 and 568 in the first side wall portion 512 and are secured thereto by suitable means, such as by welding. The inlet pipes 562 and 564 have mitered outlet openings 570 and 572 so as to control the expansion of the air suspension of filtrate as it exits from the relatively small inlet pipes 562 and 564 into the relatively large vessel 502. An impingement plate 574 extends between and is secured to the front wall portion 508 and the back wall portion 510 by suitable means such as by welding. The impingement plate 574 has a concave arcuate surface 576 facing the metered outlet 570 of the inlet pipe 62. The air suspension of filtrate exits through the metered outlet 570 with sufficient velocity s that a portion thereof contacts the impingement plate 574. The cooperation between the air suspension of filtrate exiting from the inlet pipe 562 and the impingement plate 574 function to collapse foam bubbles in the air suspension of filtrate. In a conventional filter system, the air suspension of filtrate in the inlet pipe 562 comprises more air than filtrate and the air suspension of filtrate in the inlet pipe 564 comprises more filtrate than air.

An air outlet pipe 578 is connected to the top wall portion 504 around an opening formed in the top wall portion 504 by suitable means such as by welding. The air outlet pipe 578 is provided with a flange 580 for connection with suitable means (not shown) for withdrawing air from the vessel 502 and forming a vacuum therein. The air outlet pipe 578 is close to the second side wall portion 514.

A filtrate outlet pipe 582 is connected to the second side wall portion 514 around an opening formed in the second side wall portion 514 by suitable means such as by welding. The filtrate outlet pipe is provided with a flange 584 for connection with the pump means (not shown) for withdrawing filtrate from the vessel 502. The filtrate outlet pipe 582 is located close to the lowest part of the bottom wall portion 506. During operating conditions, a reservoir of filtrate having a surface 507 located below the air suspension inlet pipe 564 is maintained in the vessel 502 so that only filtrate exits through the filtrate outlet pipe 582.

The base 516 comprises one L shaped member 586 having the portion 530 secured thereto at one end by welding and the portion 546 secured thereto at the other end thereof by suitable means such as by welding. The base 516 has another L shaped member 588 having the portion 544 secured thereto at the other end thereof by suitable means such as by welding. The base 516 is spaced a short distance below the lowermost portion of the bottom wall portion 506. End caps 590 and 592 may be used to cover the ends of members 586 and 588.

In operation, filtrate in an air suspension flows into the vessel through the inlet pipes 562 and 564 and exit through the mitered outlets 570 and 572 of the pipes. Portions of the air suspension of filtrate exiting from the upper inlet pipe 62 impinge on the impingement means 574 so that any foam therein is collapsed. As the air suspension of filtrate loses its velocity, the filtrate drops out and falls to the bottom of the vessel where it is drawn out of the vessel through the filtrate outlet pipe 82. The separated air is displaced out of the vessel through the air outlet pipe 578.

The compactness of the entire platform is enhanced by the flocculating device which produces compact filter cake so that the air drawn through the cake is lower than conventional practice and, therefore, a much smaller vacuum pump can be used.

In fact, the vacuum pump displacement is low enough that small, wet ring vacuum pumps can be used. A wet ring vacuum pump can tolerate much more filtrate suspended in the air stream going to the vacuum pump, hence, conventional large air/water separators (Slug Traps) mounted many feet above the platform are eliminated. So-called dry type or lobe type vacuum pumps can tolerate very little carry-over since they are positive displacement and have very close tolerances, whereas, with the wet ring vacuum pump, the pistons are actually made by the water (wet ring and the bladed impeller in the pump.

Hence, the lower displacement required for cakes formed by the flocculating system allows smaller, more compact vacuum pumps like the wet ring type and eliminates the secondary air/water separators that would have to be installed many feet above the platform and thereby require superstructures for installation of the platform unit.

Therefore, the platform unit is not only narrow for shipping and minimum floor space, it has a very low profile allowing installation in places where headroom is at a premium.

The use of a vacuum receiver of this invention also provides protection for the filtrate pump. As stated above, it is necessary that only filtrate exits through the filtrate outlet pipe. A vacuum receiver of this invention provides a reservoir of filtrate of about 17 gallons for the filtrate outlet pipe while a round vacuum receiver for the same service provides a reservoir of filtrate of only about 9 gallons for the filtrate outlet pipe.

It is contemplated that the inventive concepts herein described may be variously otherwise embodied and it is intended that the appended claims be construed to include alternative embodiments of the invention except insofar as limited by the prior art.

What is claimed is:

1. A filter system for filtration of solid particulate materials, in a mineral particle slurry, wherein the solid particulate materials are removed from the liquids during passage of the liquids through a filter media by formation of a cake of particulate material on the filter media while removing the liquids therefrom, the system comprising:

a rectangularly shaped support platform having a pair of laterally opposite relatively long side edge surfaces and a pair of laterally opposite relatively short side edge surfaces;

a flocculating unit for receiving the slurry to form a flocculated slurry and being mounted on said support platform and said flocculating unit comprising:

a flocculator tank means for receiving and treating the slurry;

mechanical agitator means mounted in said tank means for providing a zone of intense mechanical agitation in the slurry in said tank means so that the particles in the slurry are subject to intense agitation producing rapid turbulent motion; drive means for creating the zone of intense mechanical agitation in said tank means by rotation of said mechanical agitator means at tip speeds of between about 300 to 600 feet per minute;

flocculant feed means mounted in said tank means for introducing into said zone of intense mechanical agitation a diluted polymer flocculant material so that the flocculant activated polymer material is also subject to intense mechanical agitation in the zone of intense mechanical agitation to react rapidly and thoroughly with the particles to form relatively small bead-like floccule particles which may be subsequently filtered from the water at unusually fast rates and produce filter cakes that are characteristically firm and non-sticky for excellent, clean rapid filter cake release and discharge; said flocculator tank means being cylindrical and having a central flow separation means provided by a cylindrical side wall with an upper inlet opening located adjacent the upper end portion of the tank means and a lower outlet opening adjacent the lower end portion of the tank means and said agitator means being coaxially mounted adjacent the lower outlet opening for causing flow of the slurry downwardly in said central flow separation means from said upper inlet opening to said lower outlet opening and into contact with said agitator means;

a vacuum filter unit having a central longitudinal axis of rotation mounted on a central portion of said support platform with said central longitudinal axis of rotation parallel to said relatively short side edge surfaces;

slurry conduit means for transferring said flocculated slurry containing said head-like floccule particles from said flocculating unit to said vacuum filter unit;

a filter cake and an air suspension of filtrate formed by said vacuum filter unit;

a vacuum receiver means mounted on said support platform adjacent and separated from and in space relationship to one end of said vacuum filter unit for directly receiving said air suspension of filtrate from said vacuum filter unit and for separating said air suspension of filtrate into air and filtrate;

air-filtrate conduit means for transferring said air suspension of filtrate from said vacuum filter unit to said vacuum receiver means;

air-filtrate inlet means on said vacuum receiver means for supplying said air suspension of filtrate to said vacuum receiver means;

filtrate outlet means on said vacuum receiver means to remove filtrate therefrom;

air outlet means on said vacuum receiver means to remove air therefrom; and vacuum pump generating means mounted on said support platform and being connected to said air outlet means for forming a vacuum in said vacuum receiver means and in said vacuum filter unit.

2. A filter system as in claim 1 wherein said vacuum receiver means comprises:

a top wall portion, a bottom wall portion, a front wall portion, a back wall portion, a first side wall portion and a second side wall portion, defining a chamber means for providing a lowermost filtrate reservoir chamber portion, an uppermost air-filtrate receiving chamber portion, and an uppermost vacuum chamber portion; and impingement deflector wall means separating said uppermost air-filtrate receiving portion and said uppermost vacuum chamber portion and being located so that at least a portion of said air suspension of filtrate moves into contact with said impingement deflector wall means and causes the filtrate to flow downwardly to said lowermost filtrate reservoir portion.

3. A filter system as in claim 2 wherein:
said impingement deflector wall means has an arcuate concave surface for contact with said portion of said air suspension of filtrate.

4. A filter system as in claim 2 wherein:
said inlet means being located in said first side wall portion above said lowermost filtrate reservoir portion opposite said impingement deflector wall means;
said filtrate outlet means being located in said second side wall portion adjacent to said bottom wall portion; and
said air outlet means being located in said top wall portion adjacent to said second side wall portion.

5. A filter system as defined in claim 4 and wherein:
said impingement deflector means extending between and secured to said front wall portion and said back wall portion and said upper wall portion and located between said inlet means and said air outlet means and above said lowermost filtrate reservoir portion.

6. A filter system as in claim 5 wherein:
said impingement means provide reinforcing for siad front wall portion and said back wall portion to restrain inward movement thereof.

7. A filter system as in claim 6 wherein said inlet means comprises:
a pair of spaced apart pipes passing through and secured to said first side wall portion; and
each of said pair of spaced apart pipes having mitered outlet openings.

8. A filter system as in claim 4 wherein said vacuum receiver further comprises:
a base for supporting said vacuum receiver.

9. A filter system, as in claim 4 wherein:
said vacuum receiver has a length, width and a height; and
said width being substantially smaller than the greatest extent of said length o said height.

10. A filter system, as in claim 9 wherein:
said width is about one-third of the largest extent of said length.

11. A filter system, as in claim 1 wherein said vacuum receiver further comprises:

reinforcing means secured to said wall protions to restrain said wall portions from moving inwardly.

12. A system for filtering mineral particles in a slurry comprising:

vacuum filter means for receiving the slurry and forming a cake of mineral particles and collecting filtrate by subjecting the slurry to vacuum through a filter medium which supports the cake;

a flocculator tank means separate from and located upstream of said filter means for receiving and treating the slurry prior to delivery to the vacuum filter means;

slurry feed means for feeding the slurry to said tank means;

mechanical agitator means mounted in said tank means for providing a zone of intense mechanical agitation in the slurry in said tank means so that the particles in the slurry are subject to intense agitation producing rapid turbulent motion; drive means for creating the zone of intense mechanical agitation in said tank means by rotation of said mechanical agitator means at tip speeds of between about 300 to 600 feet per minute;

flocculant feed means mounted in said tank means for introducing into said zone of intense mechanical agitation a diluted polymer flocculant material so that the flocculant activated polymer material is also subject to intense mechanical agitation in the zone of intense mechanical agitation to react rapidly and thoroughly with the particles to form relatively small bead-like floccule particles which may be subsequently filtered from the water at unusually fast rates and produce filter cakes that are characteristically firm and non-sticky for excellent, clean rapid filter cake release and discharge; said flocculator tank means being cylindrical and having a central flow separation means provided by a cylindrical side wall with an upper inlet opening located adjacent the upper end portion of the tank means and a lower outlet opening located adjacent the lower end portion of the tank means and said agitator means being coaxially mounted adjacent the lower outlet opening for causing flow of the slurry downwardly in said central flow separation means from said upper inlet opening to said lower outlet opening and into contact with said agitator means cinduit means for connecting said tank means to said filter means and for delivering the slurry containing said bead-like floccule particle from said tank means to said filter means after treatment in said tank means;

a vacuum receiver means mounted in separate laterally spaced relationship to said vacuum filter means and having a chamber means for receiving filtrate and air from said vacuum filter means;

air-filtrate conduit means extending between said vacuum filter means and said vacuum receiver means for transfer of filtrate and air from said vacuum filter means to said vacuum receiver means;

a low volume vacuum pump means connected to said vacuum receiver means for creating a vacuum in said vacuum receiver means and in said vacuum filter means through said air-filtrate conduit means and for causing flow of air and filtrate from said vacuum filter means to said vacuum receiver means; and a filtrate pump means connected to vacuum receiver means for removing filtrate from said vacuum-filtrate receiver means.

13. The invention as defined in claim 12 and wherein said vacuum receiver means comprising:
   a lowermost filtrate reservoir means portion for receiving and holding filtrate at a level below said air-filtrate conduit means;
   an uppermost vacuum supply chamber means portion located above the filtrate level; and
   an uppermost air-filtrate receiving portion located above the filtrate level receiving air and filtrate from said vacuum filter means.

14. The invention as defined in claim 13 and wherein said vacuum receiver means further comprising:
   a generally rectangular box-like structure having a pair of laterally spaced flat vertically extending side wall portions, a horizontally extending upper wall portion, a downwardly inclined bottom wall portion, a first vertically extending end wall portion, a second vertically extending end wall portion laterally spaced from and located opposite said first end wall portion; and
   air-filtrate deflector means mounted in said vacuum receiver means in spaced relationship to said first end wall protion and said second end wall portion for causing flow of the filtrate to said lowermost filtrate reservoir portion.

15. The invention as defined in claim 14 and wherein:
   said air-filtrate conduit means being connected to said uppermost air-filtrate receiving portion of said chamber means by air-filtrate inlet port means mounted in said first end wall portion opposite and laterally spaced from said deflector means;
   said vacuum pump means being connected to said chamber means by vacuum supply port means located between said deflector means and said second end wall portion and being separated from said air-filtrate port means by said deflector means; and
   said filtrate pump means being connected to said lower filtrate reservoir portion of said chamber means for removing filtrate from said vacuum receiver means.

16. The invention as defined in claim 15 and wherein:
   said lowermost filtrate reservoir means portion receiving and holding filtrate at a level below said air-filtrate port means and said deflector means and said vacuum supply port means;
   said uppermost vacuum supply chamber means portion being located above the filtrate level and between said vacuum supply port means and said deflector means; and
   said uppermost air-filtrate receiving portion located above the filtrate level and between said air-filtrate port means and said deflector means.

17. The invention as defined in claim 12 or 16 and wherein:
   said flocculant feed means comprising blender means for mixing a supply of flocculant material with a supply of water to provide a concentration of 0.05% or less of flocculant material.

18. The invention as defined in claim 12 or 16 and wherein:
   said flocculation tank means and said mechanical agitation means and said slurry feed means being constructed and arranged to provide a retention time of the slurry during flocculation of between about 15 seconds to 60 seconds.

* * * * *

UNITED STATES PATENT AND TRADEMARK OFFICE
CERTIFICATE OF CORRECTION

PATENT NO. : 4,775,468

DATED : October 4, 1988

INVENTOR(S) : C. Lynn Peterson

It is certified that error appears in the above-identified patent and that said Letters Patent is hereby corrected as shown below:

Column 4, line 37, "conveyor" should read --conveyor 2--; and
          line 50, "int" should read --into--.
Column 5, line 14, "unit 2" should read --unit 28--; and
          line 54, "having" should be deleted.
Column 6, line 13, "turblent" should read --turbulent--; and
          line 35, "of" (2nd instance) should be deleted.
Column 7, line 57, "the flocculation" should read --flocculation--; and "22 x zero" should read --28 x zero--.
Column 8, line 22, --of-- should be inserted between "zone" and "intense"; and " suitable of" should read --suitable--.
Column 9, line 4, "flocculation tank or" should have been inserted before "vessel";
          line 5, "flocculation tank or" should be deleted;
          line 6, --support bridge means 99,-- should have been inserted before "a bottom 100";
          line 7, "a support bridge means 99" should be deleted; and
          line 31, "above" should read --herein--.
Column 12, line 22,"s that the ope" should read --so that the open--.
          line 40, "baffles 25" should read --baffles 258--.
Column 13, line 45, "opening 26" should read --opening 260--.
Column 16, line 33, "s" should read --so--.

UNITED STATES PATENT AND TRADEMARK OFFICE
CERTIFICATE OF CORRECTION

PATENT NO. : 4,775,468

DATED : October 4, 1988

INVENTOR(S) : C. Lynn Peterson

It is certified that error appears in the above-identified patent and that said Letters Patent is hereby corrected as shown below:

Claim 1, Column 18, line 49, "head-like" should read --bead-like--.
Claim 7, Column 19, line 47, "siad" should read --said--.
Claim 11, Column 19, line 63, "o" should read --or--.
Claim 18, Column 20, line 49, "cinduit" should read --conduit--.

Signed and Sealed this

Fourth Day of April, 1989

Attest:

DONALD J. QUIGG

*Attesting Officer*

Commissioner of Patents and Trademarks